(12) United States Patent
Kodaira

(10) Patent No.: US 10,551,600 B2
(45) Date of Patent: Feb. 4, 2020

(54) ZOOM LENS AND IMAGE PICKUP APPARATUS

(71) Applicant: CANON KABUSHIKI KAISHA, Tokyo (JP)

(72) Inventor: Masakazu Kodaira, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/906,428

(22) Filed: Feb. 27, 2018

(65) Prior Publication Data

US 2018/0246303 A1 Aug. 30, 2018

(30) Foreign Application Priority Data

Feb. 28, 2017 (JP) ................. 2017-037103

(51) Int. Cl.
*G02B 15/14* (2006.01)
*G02B 9/60* (2006.01)
*G02B 9/34* (2006.01)

(52) U.S. Cl.
CPC ............. *G02B 15/14* (2013.01); *G02B 9/34* (2013.01); *G02B 9/60* (2013.01)

(58) Field of Classification Search
CPC . G02B 15/14; G02B 9/34; G02B 9/60; G02B 15/173

USPC .................................. 359/676, 686
See application file for complete search history.

(56) References Cited

U.S. PATENT DOCUMENTS

| | | | |
|---|---|---|---|
| 9,588,323 B2 | 3/2017 | Tatenuma et al. | |
| 9,835,932 B2* | 12/2017 | Imaoka | G02B 15/177 |
| 2016/0124199 A1 | 5/2016 | Sanjo et al. | |
| 2018/0011301 A1 | 1/2018 | Kodaira | |
| 2018/0017771 A1* | 1/2018 | Kawamura | G02B 15/20 |

FOREIGN PATENT DOCUMENTS

JP H08-29738 A 2/1996

* cited by examiner

*Primary Examiner* — James R Greece
(74) *Attorney, Agent, or Firm* — Carter, DeLuca & Farrell LLP

(57) ABSTRACT

A zoom lens which include, in order from an object side: a unit A including a unit configured to move for zooming; an aperture stop; and a positive unit B configured not to move for zooming, in which the unit B includes front and rear units with an air interval therebetween longest between the aperture stop and an image plane of the zoom lens, in which the front unit consists of, in order from the object side, a positive first front unit, a negative second front unit configured to move perpendicular to an optical axis of the zoom lens to perform image stabilization, and a third front unit having a positive refractive power, in which a lateral magnification of the second front unit, focal lengths of the first front unit, the second front unit, and the third front unit are set appropriately.

17 Claims, 21 Drawing Sheets

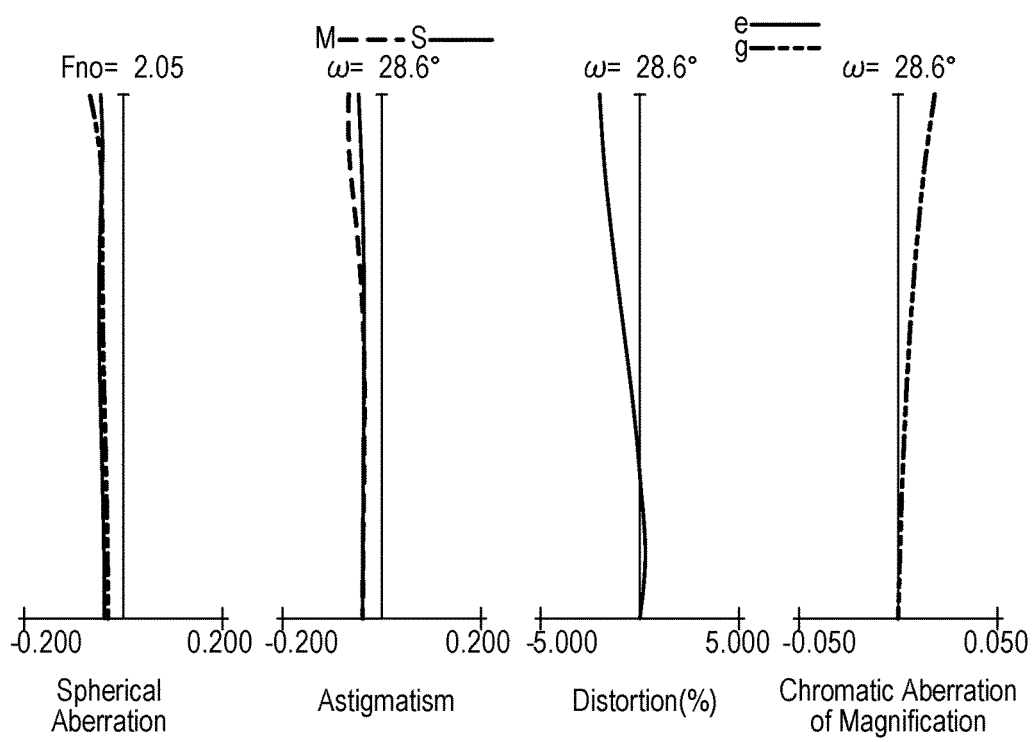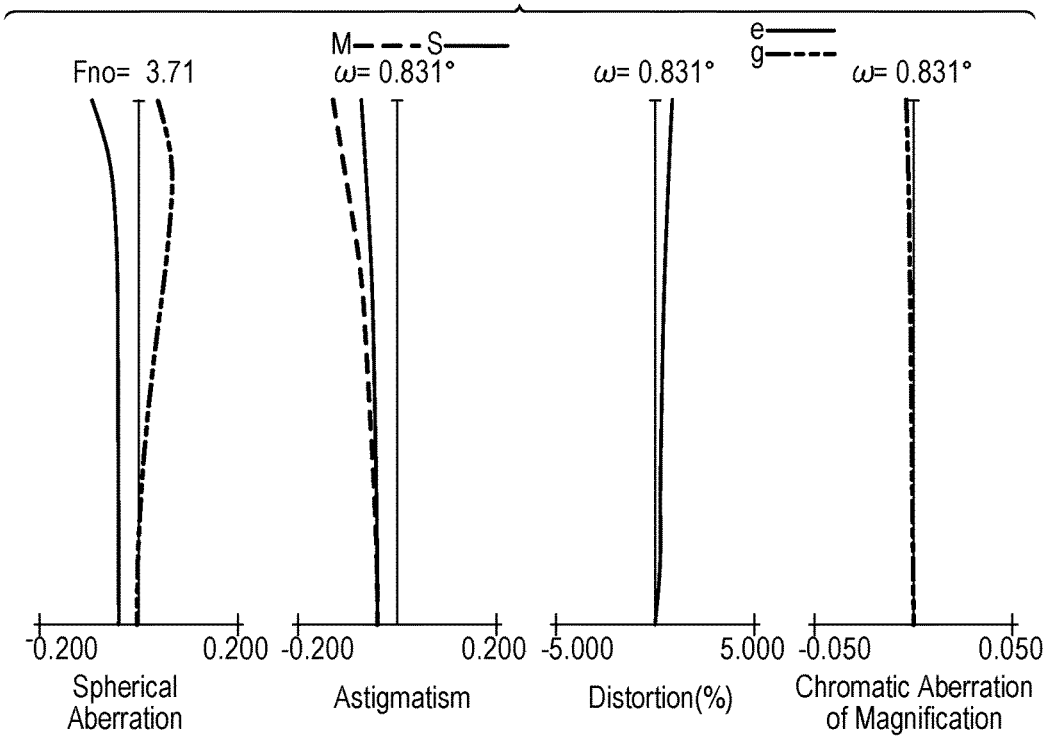

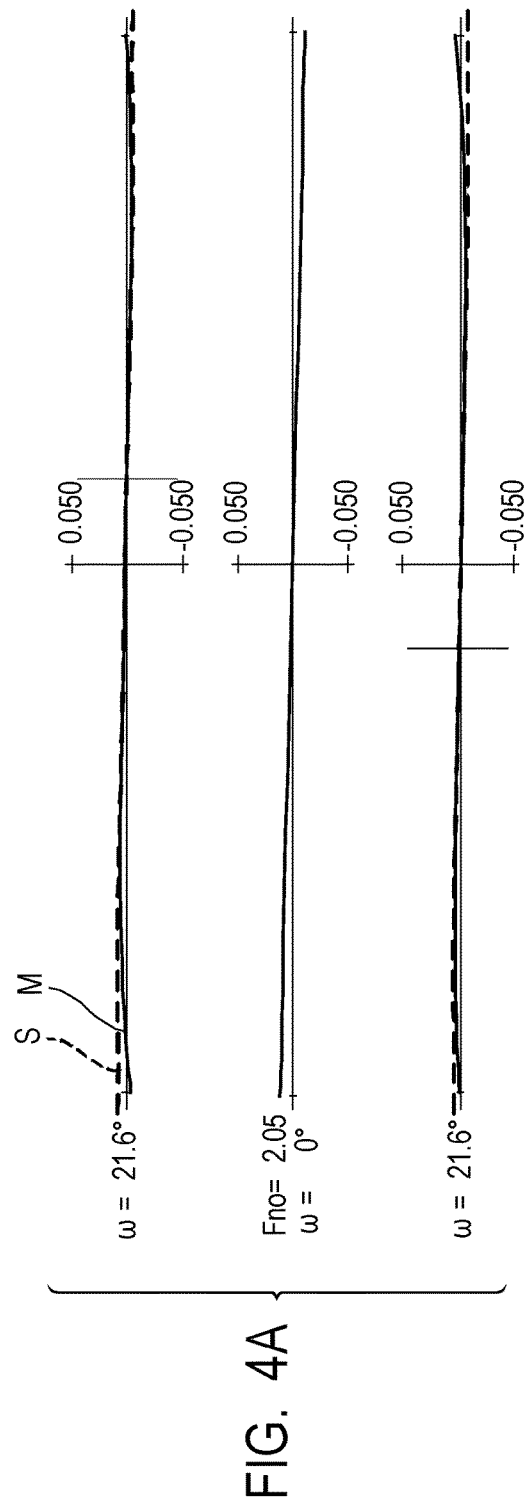
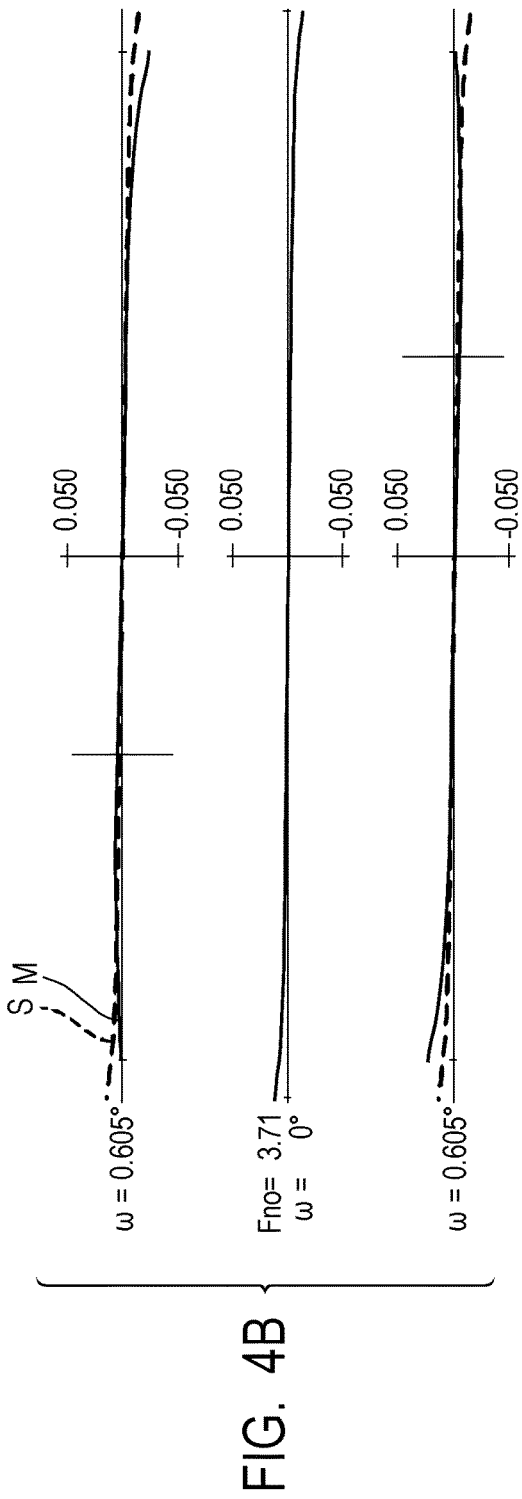
FIG. 4A
FIG. 4B

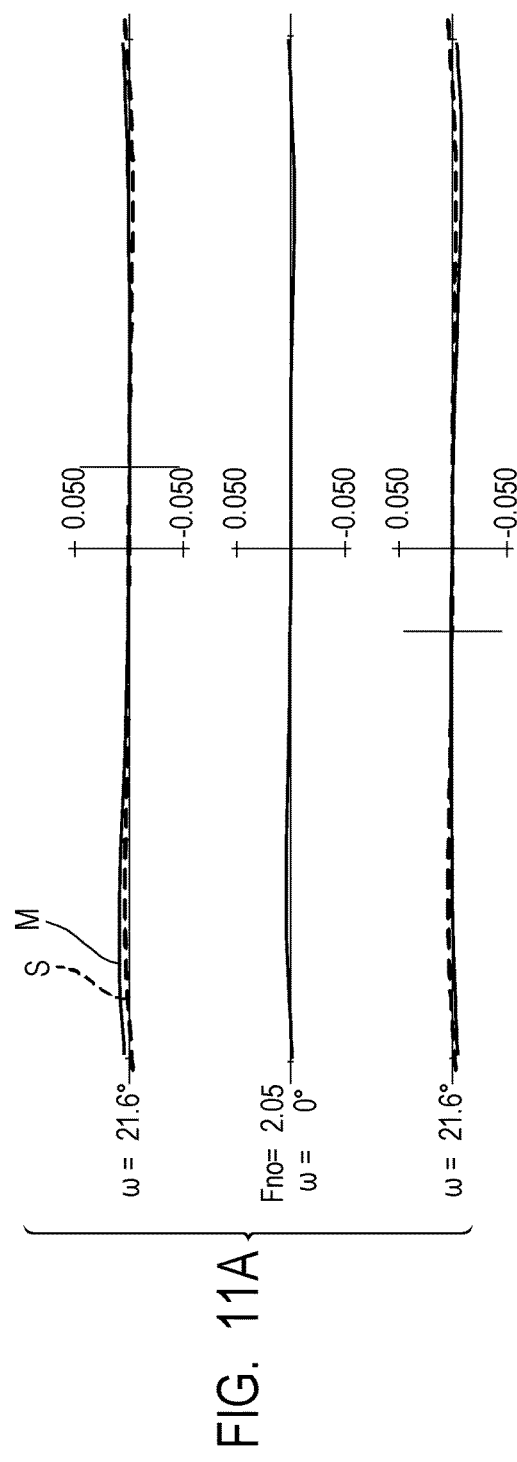
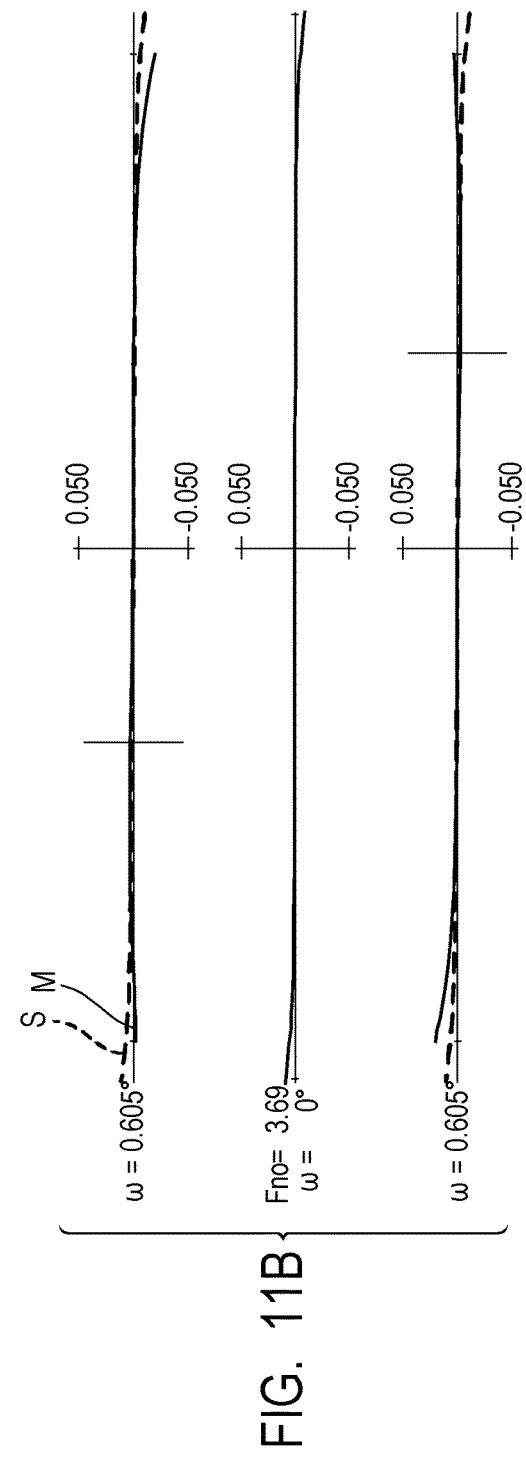
FIG. 11A
FIG. 11B

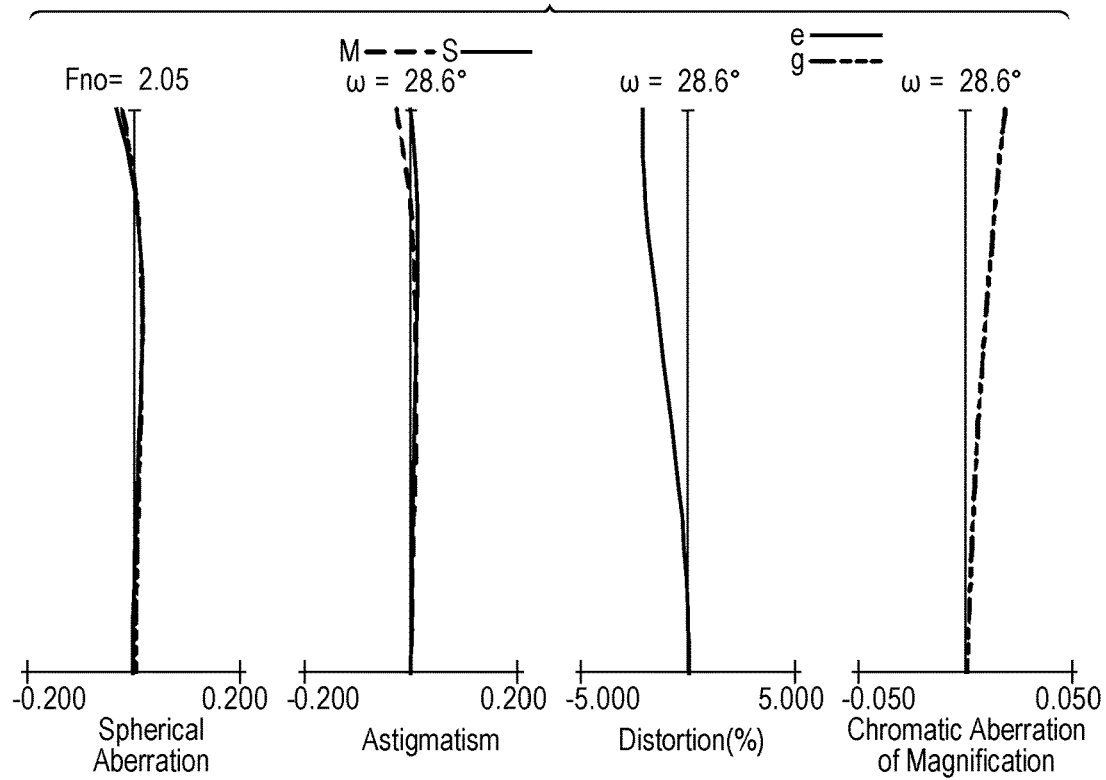
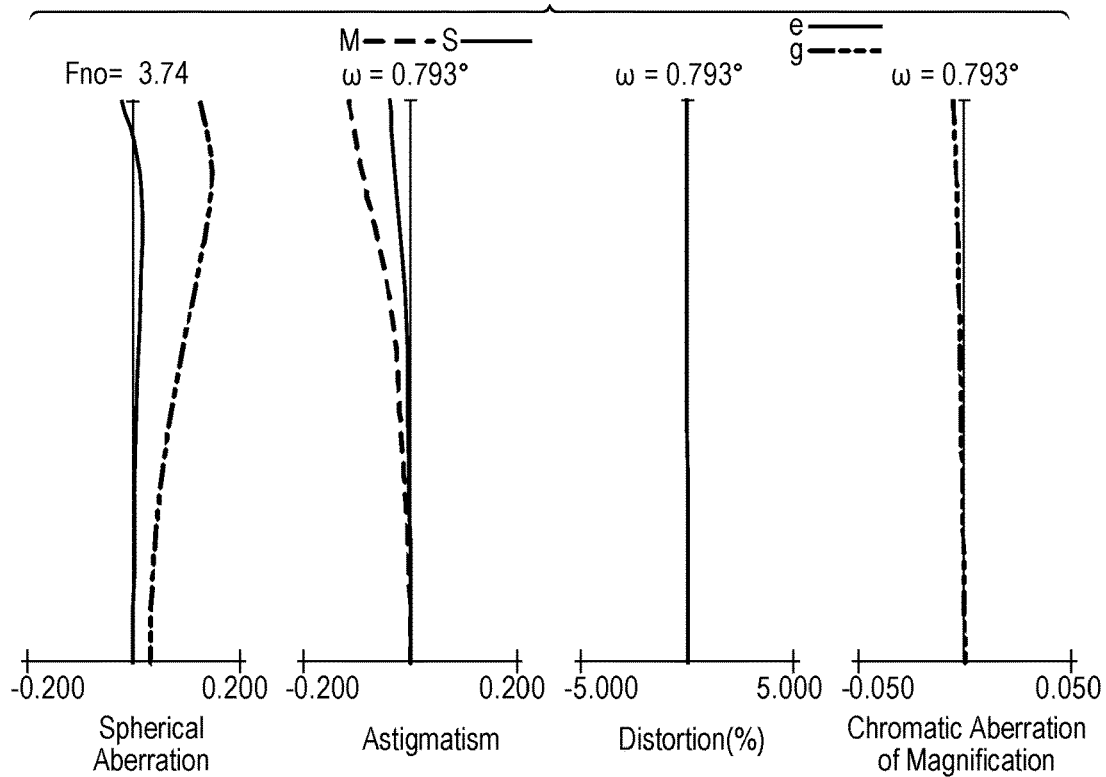

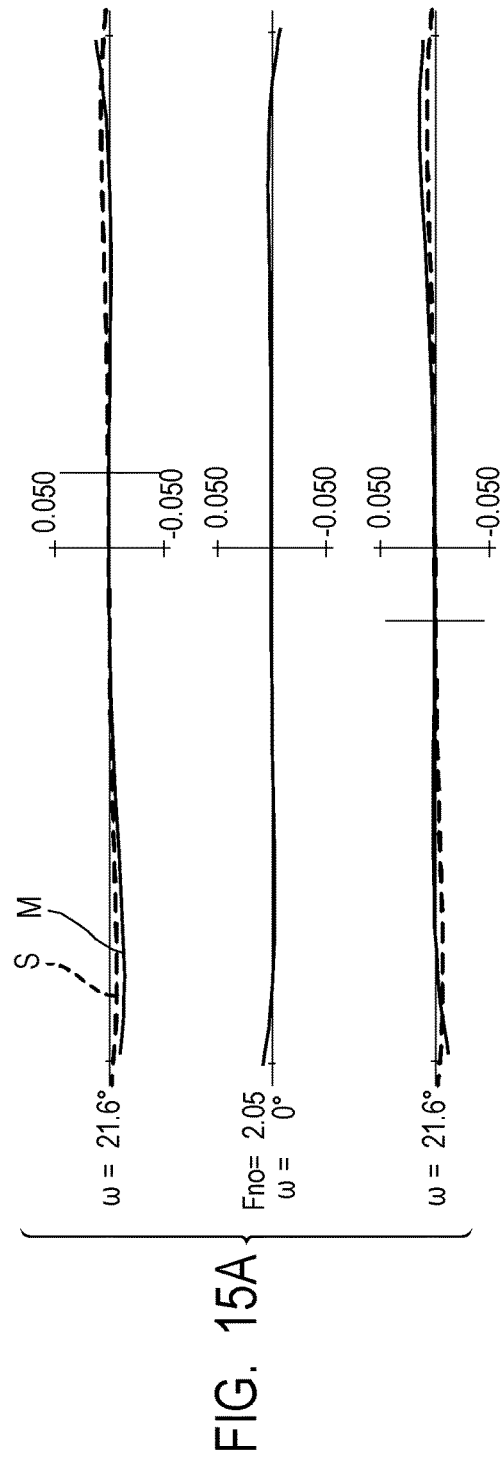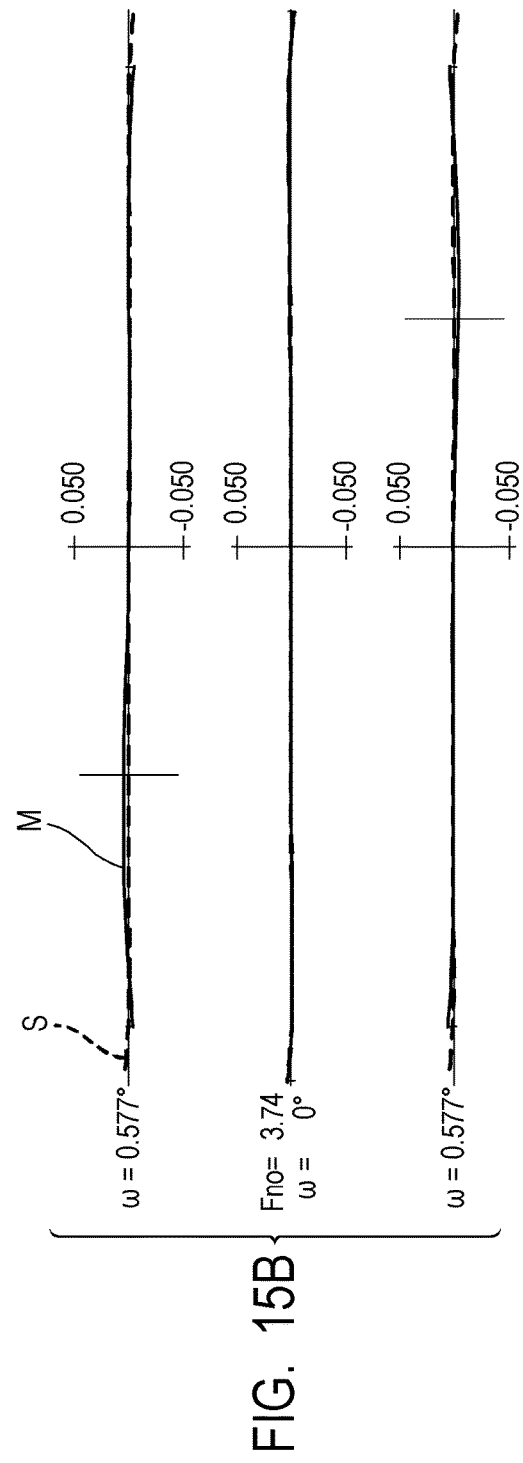

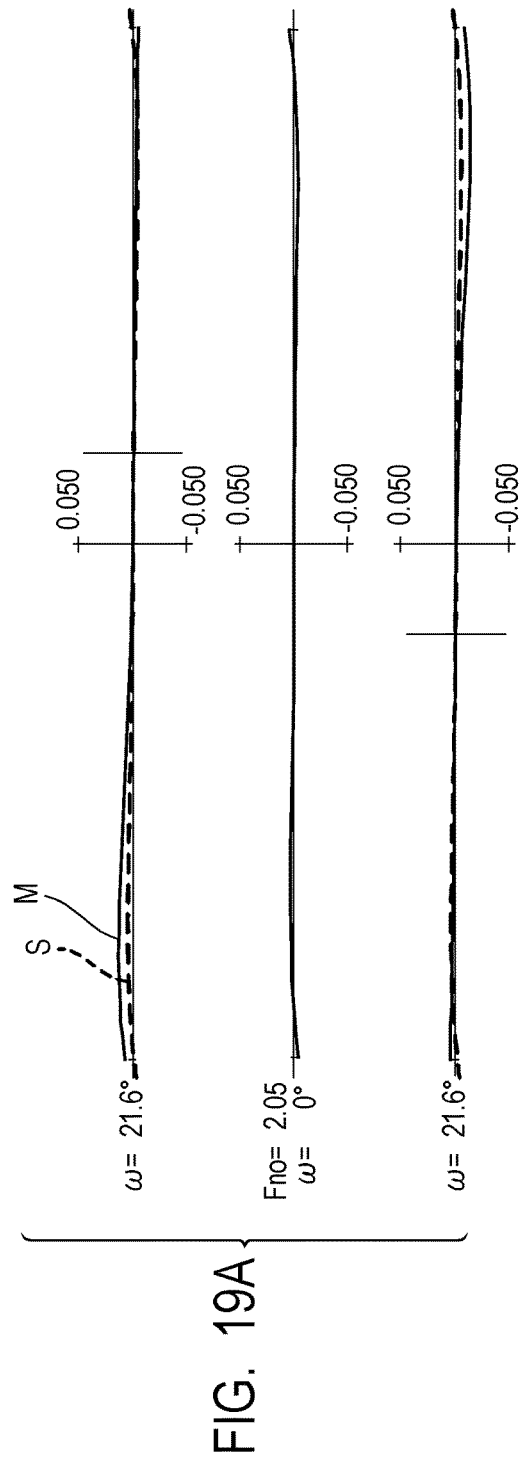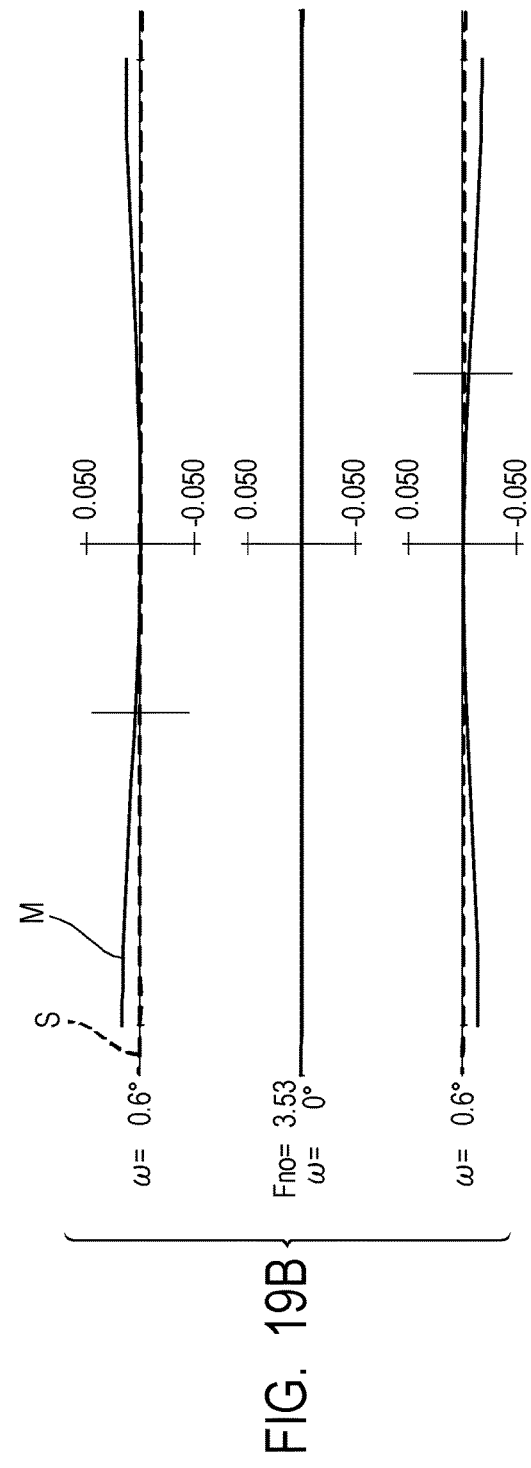

ZOOM LENS AND IMAGE PICKUP APPARATUS

BACKGROUND OF THE INVENTION

Field of the Invention

The present invention relates to a zoom lens and an image pickup apparatus.

Description of the Related Art

As image pickup devices of color television cameras for broadcasting, ⅔-inch CCDs (solid image pickup elements) are the mainstream, and in recent years, the number of pixels has been increasing further from HD. A CCD has a substantially uniform resolution over the entire image pickup range, and hence a zoom lens using the CCD is required to have a substantially uniform resolution from the center of an image plane to a periphery of the image plane. The zoom lens is required to be satisfactorily corrected in various aberrations, such as coma, astigmatism, and distortion, and to have high optical performance over the entire image plane, for example, and is desired to have a large aperture, a wide angle, and a high zooming ratio as well as a small size and a light weight. Moreover, there is an increasing demand for reducing image blur (image stabilization function) due to oscillation and hand shake, which may occur particularly when a photographing system having a long focal length is used.

It is difficult to achieve higher performance as well as a smaller size and a lighter weight in the image stabilization function for television cameras in the related art unless focal lengths of respective units are set appropriately.

In Japanese Patent Application Laid-Open No. H08-29738, there is disclosed a zoom lens including a magnifying optical system having a four-unit configuration including four lens units having positive, negative, negative, and positive refractive powers, in which a front lens unit, which is the fourth lens unit having the positive refractive power, is configured to move in a direction perpendicular to an optical axis to perform image stabilization. In the zoom lens, the image stabilizing lens unit is a lens unit having a positive refractive power and a relatively small image stabilization effect (movement amount on the optical axis with respect to a decentering amount), with the result that the movement amount of the image stabilizing lens unit may be increased to increase a size of a drive mechanism.

SUMMARY OF THE INVENTION

The present invention provides, for example, a zoom lens having an image stabilization function, which is advantageous in a high optical performance as well as a small size and a light weight.

In order to achieve the above-mentioned object, according to one embodiment of the present invention, there are provided a zoom lens and an image pickup apparatus including the same which include in order from an object side to an image side: a lens unit A, which includes a lens unit configured to move for zooming; an aperture stop; and a lens unit B having a positive refractive power and configured not to move for zooming, in which the lens unit B includes a front lens unit and a rear lens unit with an air interval therebetween longest between the aperture stop and an image plane of the zoom lens, in which the front lens unit consists of in order from the object side to the image side: a first front lens unit having a positive refractive power; a second front lens unit having a negative refractive power and configured to move in a direction having a component perpendicular to an optical axis of the zoom lens to perform image stabilization; and a third front lens unit having a positive refractive power, in which conditional expressions:

$-20.00 < \beta_{r2} < -0.20;$ $-9.00 < f_{r1}/f_{r2} < -0.05;$ and $-20.00 < f_{r3}/f_{r2} < -1.00,$ are satisfied, where $\beta_{r2}$ represents a lateral magnification of the second front lens unit, $f_{r1}$ represents a focal length of the first front lens unit, $f_{r2}$ represents a focal length of the second front lens unit, and $f_{r3}$ represents a focal length of the third front lens unit.

Further features of the present invention will become apparent from the following description of exemplary embodiments with reference to the attached drawings.

BRIEF DESCRIPTION OF THE DRAWINGS

FIG. 2A is a longitudinal aberration diagram of the zoom lens according to Numerical Example 1 when focusing on the object at infinity at the wide-angle end.

FIG. 2B is a longitudinal aberration diagram of the zoom lens according to Numerical Example 1 when focusing on the object at infinity at a telephoto end.

FIG. 4A is a lateral aberration diagram of the zoom lens according to Numerical Example 1 when focusing on the object at infinity at the wide-angle end and when an image stabilizing lens unit is shifted by 1 mm with the image heights of 0 mm and ±4 mm.

FIG. 4B is a lateral aberration diagram of the zoom lens according to Numerical Example 1 when focusing on the object at infinity at the telephoto end and when the image stabilizing lens unit is shifted by 1 mm with the image heights of 0 mm and ±4 mm.

FIG. 11A is a lateral aberration diagram of the zoom lens according to Numerical Example 3 when focusing on the object at infinity at the wide-angle end with image heights of 0 mm and ±4 mm.

FIG. 11B is a lateral aberration diagram of the zoom lens according to Numerical Example 3 when focusing on the object at infinity at the telephoto end with the image heights of 0 mm and ±4 mm.

FIG. 14A is a longitudinal aberration diagram of the zoom lens according to Numerical Example 4 when focusing on the object at infinity at the wide-angle end.

FIG. 14B is a longitudinal aberration diagram of the zoom lens according to Numerical Example 4 when focusing on the object at infinity at a telephoto end.

FIG. 15A is a lateral aberration diagram of the zoom lens according to Numerical Example 4 when focusing on the object at infinity at the wide-angle end with image heights of 0 mm and ±4 mm.

FIG. 15B is a lateral aberration diagram of the zoom lens according to Numerical Example 4 when focusing on the object at infinity at the telephoto end with the image heights of 0 mm and ±4 mm.

FIG. 19A is a lateral aberration diagram of the zoom lens according to Numerical Example 5 when focusing on the object at infinity at the wide-angle end with image heights of 0 mm and ±4 mm.

FIG. 19B is a lateral aberration diagram of the zoom lens according to Numerical Example 5 when focusing on the object at infinity at the telephoto end with the image heights of 0 mm and ±4 mm.

DESCRIPTION OF THE EMBODIMENTS

Figure 1:
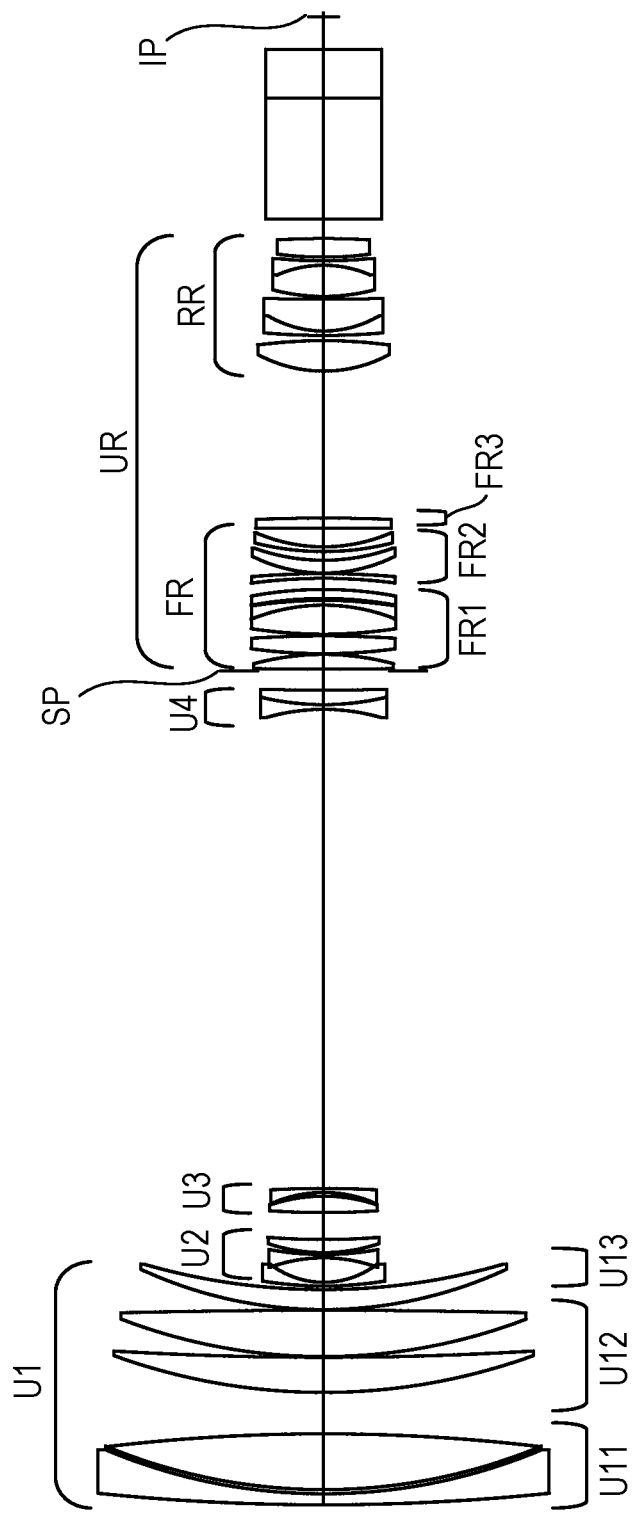
FIG. 1 is a lens cross-sectional view of a zoom lens according to Numerical Example 1 of the present invention when focusing on an object at infinity at a wide-angle end.

Now, a zoom lens according to the present invention is described in detail with reference to the accompanying drawings.

The zoom lens according to the present invention includes, in order from an object side to an image side, a zooming lens unit, which is configured to move during zooming, a stop SP, and a fixed lens unit UR having a positive refractive power, which is configured not to move for zooming and focusing, and is configured to form an image. Moreover, a second lens unit is configured to move toward the image side during zooming from a wide-angle end to a telephoto end. The wide-angle end and the telephoto end refer to zoom positions obtained when the zooming lens unit is positioned at both ends of a range in which the zooming lens unit is mechanically movable on an optical axis. The fixed lens unit UR includes a front lens unit FR and a rear lens unit RR, which are arranged with a longest air interval from the stop SP to an image plane, and the air interval is configured to be afocal for an axial ray. The front lens unit FR consists of, in order from the object side to the image side, a first front lens unit FR1 having a positive refractive power, a second front lens unit FR2, which serves as an image stabilizing lens unit having a negative refractive power, and is configured to move in a direction having a component perpendicular to the optical axis to perform image stabilization by shifting, and a third front lens unit FR3 having a positive refractive power.

With the longest air interval from the stop SP to the image plane being configured to be afocal for the axial ray, the zoom lens may be configured so that an extender, lens unit which is an optical system configured to shift a focal length of the entire system of the zoom lens, is removably insertable at a position of the air interval in an optical path. The term "afocal" indicates a state in which an inclination $\alpha_{ie}$ of a paraxial axial ray is substantially zero. The term "paraxial axial ray" refers to a paraxial ray obtained when the focal length of the entire system of an optical system is normalized to 1, and when light having a height from the optical axis of 1 is allowed to enter parallel to the optical axis of the optical system. An inclination of a ray is obtained by dividing a difference between heights of the ray in a freely-selected section by a length of the section. It is preferred to set the inclination $\alpha_{ie}$ of the ray as follows:

$$0 \leq |\alpha_{ie}| < +0.03.$$

In a related-art four-unit zoom lens, a movement locus of a third lens unit U3 is uniquely determined for image point correction. Specifically, the third lens unit U3 is configured to move along a locus that is convex toward the object side. In the present invention, a magnifying lens unit includes two or more movable lens units. Therefore, movement loci of a second lens unit U2 and the third lens unit U3 may be set suitably.

In this embodiment, the second front lens unit FR2 is used as the image stabilizing lens unit, which is configured to move in the direction having the component perpendicular to the optical axis to perform image stabilization by shifting. A lateral magnification of the second front lens unit FR2, a ratio of focal lengths of the first front lens unit FR1 with respect to the second front lens unit FR2, and a ratio of focal lengths of the third front lens unit FR3 with respect to the second front lens unit FR2 are set appropriately. As a result, there can be provided a zoom lens and an image pickup apparatus having high optical performance over the entire zooming range even during image stabilization, which are small and lightweight as the entire mechanism.

The zoom lens according to the present invention defines a lateral magnification $\beta_{r2}$ of the second front lens unit FR2 by the following conditional expression (1):

$$-20.0 < \beta_{r2} < -0.2 \tag{1}.$$

When the lateral magnification $\beta_{r2}$ exceeds the upper limit value of the conditional expression (1), the image stabilizing lens unit (second front lens unit FR2) raises the axial ray, with the result that a glass diameter on a back side is increased to increase a lens system. When the lateral magnification $\beta_{r2}$ falls below the lower limit value of the conditional expression (1), a refractive power of a lens unit before the image stabilizing lens unit becomes much larger, with the result that good optical performance cannot be obtained during image stabilization.

It is more preferred to set the conditional expression (1) as follows:

$$-17.0 < \beta_{r2} < -0.4 \tag{1a}.$$

The embodiment of the present invention may satisfy the above-mentioned configuration to provide the zoom lens and the image pickup apparatus having the high optical performance over the entire zooming range even during image stabilization, which are small and lightweight as the entire mechanism.

The zoom lens according to the present invention further defines a ratio between a focal length $f_{r1}$ of the first front lens unit FR1 and a focal length $f_{r2}$ of the second front lens unit FR2 by the following conditional expression (2):

$$-9.00 < f_{r1}/f_{r2} < -0.05 \tag{2}.$$

When the ratio falls below the lower limit value of the conditional expression (2), the focal length of the first front lens unit FR1 becomes much smaller with respect to the focal length of the second front lens unit FR2, and hence it becomes difficult to correct various aberrations generated in the first front lens unit FR1. As a result, sufficient optical performance cannot be obtained during image stabilization.

When the ratio exceeds the upper limit value of the conditional expression (2), the focal length of the first front lens unit FR1 becomes much larger with respect to the focal length of the second front lens unit FR2, and hence a height of the axial ray entering the image stabilizing lens unit becomes higher. As a result, the image stabilizing lens unit is increased in weight to be disadvantageous in terms of followability during image stabilization.

It is more preferred to set the conditional expression (2) as follows:

$$-6.00 < f_{r1}/f_{r2} < -0.10 \tag{2a}.$$

The zoom lens according to the present invention further defines a ratio between the focal length $f_{r2}$ of the second front lens unit FR2 and a focal length $f_{r3}$ of the third front lens unit FR3 by the following conditional expression (3):

$$-20.00 < f_{r3}/f_{r2} < -1.00 \tag{3}.$$

When the ratio falls below the lower limit value of the conditional expression (3), the focal length of the third front lens unit FR3 becomes much smaller with respect to the focal length of the second front lens unit FR2, and hence the condition of being afocal for the axial ray after passing through the third front lens unit FR3 is not established any more. As a result, when the optical system configured to convert the focal length of the entire lens system is inserted, the back focus is disadvantageously shifted.

When the ratio exceeds the upper limit value of the conditional expression (3), the focal length of the third front lens unit FR3 becomes much larger with respect to the focal length of the second front lens unit FR2, and it becomes difficult to correct the various aberrations generated in the first front lens unit FR1. As a result, sufficient optical performance cannot be obtained during image stabilization.

It is more preferred to set the conditional expression (3) as follows:

$$-17.00 < f_{r3}/f_{r2} < -1.10 \tag{3a}.$$

The zoom lens according to the present invention further defines an inclination $\alpha$ of the paraxial axial ray entering the second front lens unit FR2 and an inclination $\alpha'$ of the paraxial axial ray exiting the second front lens unit FR2 by the following conditional expression (4):

$$0.01 < |\alpha' - \alpha| < 0.15 \tag{4}.$$

The term "paraxial axial ray" refers to a paraxial ray obtained when the focal length of the entire system of the optical system is normalized to 1, and when light having a height from the optical axis of 1 is allowed to enter parallel to the optical axis of the optical system. An inclination of a ray is obtained by dividing a difference between heights of the ray in a freely-selected section by a length of the section. In the following, it is assumed that an object is on the left side of the optical system, and that a ray that enters the optical system from the object side travels from left to right. The inclination of the ray is positive in a clockwise direction, and is negative in a counterclockwise direction as measured from the optical axis.

When the difference between the inclinations $\alpha$ and $\alpha'$ of the paraxial axial ray falls below the lower limit value of the conditional expression (4), the difference becomes much smaller. As a result, optical axis sensitivity of the image stabilizing lens unit is disadvantageously reduced. Therefore, the image stabilizing lens unit is required to be displaced significantly in order to obtain the image stabilization effect, and the system is disadvantageously increased in size.

When the difference between the inclinations a and α' of the paraxial axial ray exceeds the upper limit value of the conditional expression (4), the difference becomes much larger. As a result, the optical axis sensitivity of the image stabilizing lens unit is disadvantageously increased. Therefore, it becomes difficult to precisely control the image stabilizing lens unit.

It is more preferred to set the conditional expression (4) as follows:

$$0.02 < |\alpha' - \alpha| < 0.13 \tag{4a}$$

Example 1

FIG. 1 is a lens cross-sectional view of a zoom lens according to Example 1 of the present invention when focusing on an object at infinity at a wide-angle end. The zoom lens according to Example 1 includes, in order from an object side to an image side, a first lens unit U1 having a positive refractive power, a second lens unit U2 having a negative refractive power, a third lens unit U3 having a positive refractive power, a fourth lens unit U4 having a negative refractive power, an aperture stop SP, and a fixed lens unit UR having a positive refractive power. An image plane IP corresponds to an image pickup surface of an image pickup element (photoelectric converter).

The first lens unit U1 is configured not to move for zooming. A first lens sub unit U11 includes, in order from the object side, a negative lens and a positive lens. The first lens sub unit U11 is fixed during focusing. A second lens sub unit U12 includes, in order from the object side, a positive lens and a positive lens. The second lens sub unit U12 extends toward the object side when focusing on proximity. A third lens sub unit U13 includes a positive lens. The third lens sub unit U13 extends toward the object side when focusing on proximity. The second lens sub unit U12 and the third lens sub unit U13 are configured to move along different loci during focusing from the object at infinity to a close distance object.

The second lens unit U2 is a variator lens unit, which is configured to move toward the image side during zooming from the wide-angle end (short focal length end) to the telephoto end (long focal length end). The third lens unit U3 and the fourth lens unit U4 are configured to move during zooming. The fixed lens unit UR is configured not to move for zooming.

Configurations of the respective lens units in Example 1 are described. In the following, it is assumed that respective lenses are arranged in order from the object side to the image side. The first lens unit U1 includes a negative lens and four positive lenses. The second lens unit U2 includes a negative lens, a negative lens, and a positive lens. The third lens unit U3 includes a positive lens and a negative lens. The fourth lens unit U4 includes a cemented lens formed of a negative lens and a positive lens. The fixed lens unit UR is separated into a front lens unit FR and a rear lens unit RR with the longest air interval. The front lens unit FR consists of a first front lens unit FR1 having a positive refractive power, a second front lens unit FR2 having a negative refractive power, and a third front lens unit FR3 having a positive refractive power. The second front lens unit FR2 is an image stabilizing lens unit configured to move in a direction having a component perpendicular to the optical axis to perform image stabilization by shifting. In Example 1, the first front lens unit FR1 consists of a positive lens, a positive lens, a cemented lens formed of a positive lens and a negative lens, and a negative lens. The second front lens unit FR2 consists of a negative lens, a positive lens, and a negative lens. The third front lens unit FR3 consists of a positive lens. The rear lens unit RR includes a positive lens, a negative lens, a positive lens, a positive lens, a negative lens, and a positive lens.

Figure 3A:
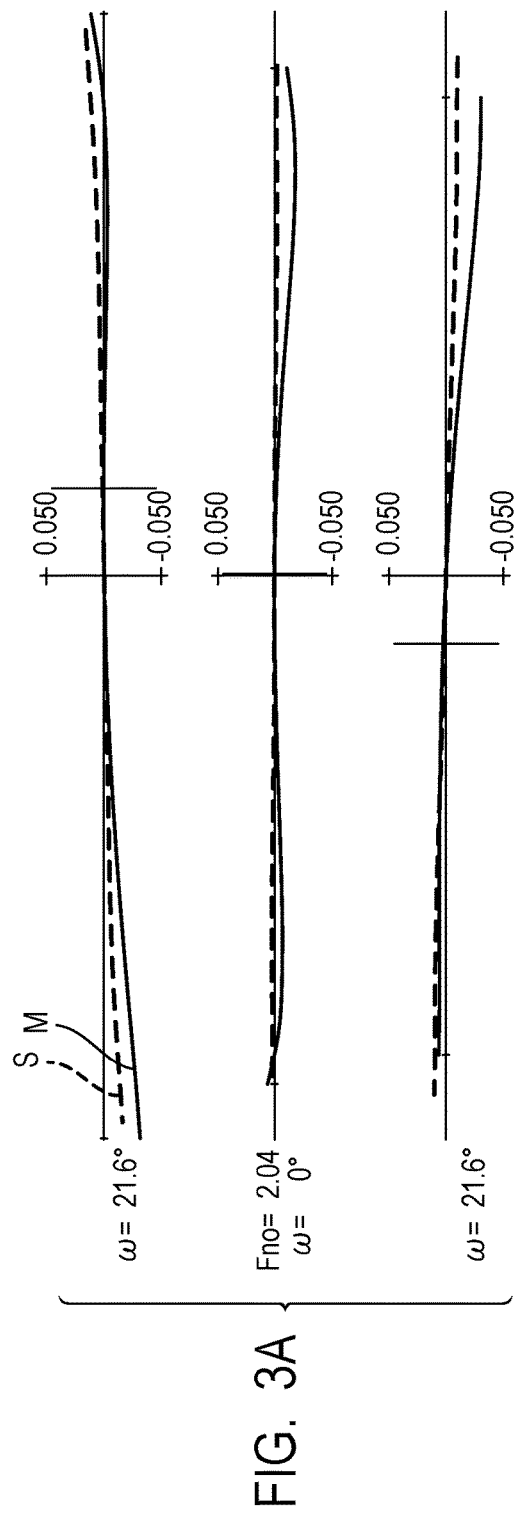
FIG. 3A is a lateral aberration diagram of the zoom lens according to Numerical Example 1 when focusing on the object at infinity at the wide-angle end with image heights of 0 mm and ±4 mm.
Figure 3B:
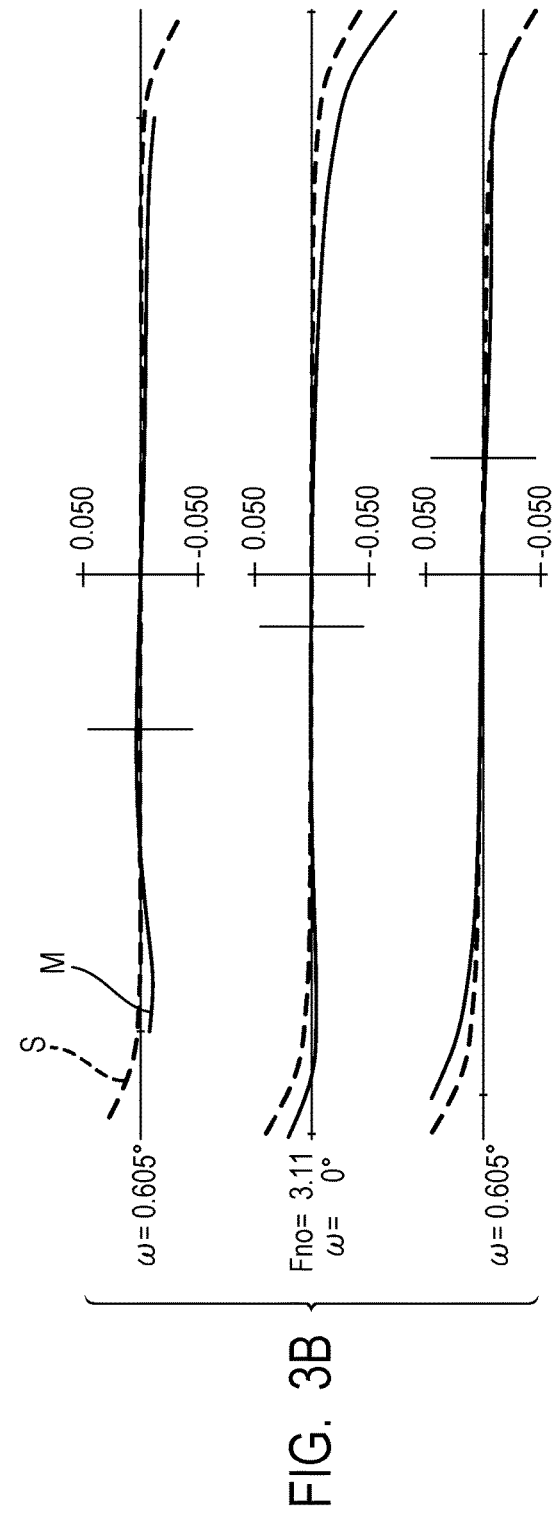
FIG. 3B is a lateral aberration diagram of the zoom lens according to Numerical Example 1 when focusing on the object at infinity at the telephoto end with the image heights of 0 mm and ±4 mm.

FIG. 2A and FIG. 2B are longitudinal aberration diagrams when focusing on the object at infinity at the wide-angle end and the telephoto end, respectively. FIG. 3A is a lateral aberration diagram when focusing on the object at infinity at the wide-angle end with image heights of 0 mm and ±4 mm. FIG. 3B is a lateral aberration diagram when focusing on the object at infinity at the telephoto end with the image heights of 0 mm and ±4 mm. FIG. 4A is a lateral aberration diagram when focusing on the object at infinity at the wide-angle end and when the image stabilizing lens unit is shifted by 1 mm with the image heights of 0 mm and ±4 mm. FIG. 4B is a lateral aberration diagram when focusing on the object at infinity at the telephoto end and when the image stabilizing lens unit is shifted by 1 mm with the image heights of 0 mm and ±4 mm. In the aberration diagrams, spherical aberration is expressed by an e-line and a g-line. Astigmatism is expressed by a meridional image plane (M) of the e-line and a sagittal image plane (S) of the e-line. Distortion is expressed by the e-line, and chromatic aberration of magnification is expressed by the g-line. Moreover, spherical aberration, astigmatism, distortion, and chromatic aberration of magnification are drawn on scales of 0.2 mm, 0.2 mm, 5%, and 0.05 mm, respectively. An F-number is represented by Fno, and a half angle of view is represented by ω. The same applies to Examples 2 to 5, which are to be described later. As illustrated in FIG. 2A, FIG. 2B, FIG. 3A, FIG. 3B, FIG. 4A, and FIG. 4B, it can be seen that the high optical performance can be achieved over the zooming range even during image stabilization.

In Table 1, values corresponding to the respective conditional expressions for the zoom lens according to Example 1 are shown. The zoom lens according to Example 1 satisfies the conditional expressions (1) to (4). As a result, there can be provided the zoom lens and an image pickup apparatus having the high optical performance over the entire zooming range even during image stabilization, which are small and lightweight as the entire mechanism.

Example 2

Figure 5:
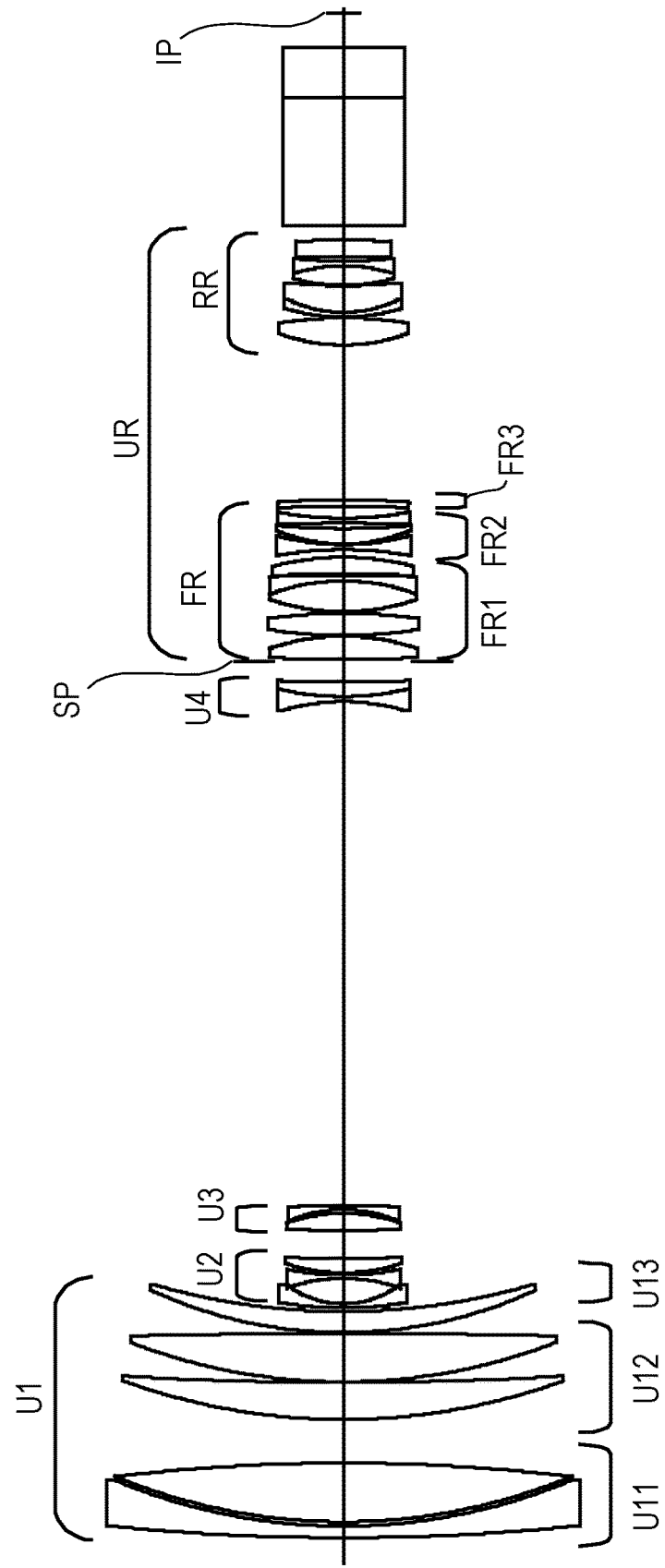
FIG. 5 is a lens cross-sectional view of a zoom lens according to Numerical Example 2 of the present invention when focusing on an object at infinity at a wide-angle end.

FIG. 5 is a lens cross-sectional view of a zoom lens according to Example 2 of the present invention when focusing on an object at infinity at a wide-angle end. The zoom lens according to Example 2 includes, in order from an object side to an image side, a first lens unit U1 having a positive refractive power, a second lens unit U2 having a negative refractive power, a third lens unit U3 having a positive refractive power, a fourth lens unit U4 having a negative refractive power, an aperture stop SP, and a fixed lens unit UR having a positive refractive power. An image plane IP corresponds to an image pickup surface of an image pickup element.

The first lens unit U1 is configured not to move for zooming. A first lens sub unit U11 includes, in order from the object side, a negative lens and a positive lens. The first lens sub unit U11 is fixed during focusing. A second lens sub unit U12 includes, in order from the object side, a positive lens and a positive lens. The second lens sub unit U12 extends toward the object side when focusing on proximity. A third lens sub unit U13 includes a positive lens. The third lens sub unit U13 extends toward the object side when focusing on proximity. The second lens sub unit U12 and the third lens sub unit U13 are configured to move along different loci during focusing from the object at infinity to a close distance object.

The second lens unit U2 is a variator lens unit, which is configured to move toward the image side during zooming from the wide-angle end to the telephoto end. The third lens unit U3 and the fourth lens unit U4 are configured to move during zooming. The fixed lens unit UR is configured not to move for zooming.

Configurations of the respective lens units in Example 2 are described. In the following, it is assumed that respective lenses are arranged in order from the object side to the image side. The first lens unit U1 includes a negative lens and four positive lenses. The second lens unit U2 includes a negative lens, a negative lens, and a positive lens. The third lens unit U3 includes a positive lens and a negative lens. The fourth lens unit U4 includes a cemented lens formed of a negative lens and a positive lens. The fixed lens unit UR is separated into a front lens unit FR and a rear lens unit RR with the longest air interval. The front lens unit FR consists of a first front lens unit FR1 having a positive refractive power, a second front lens unit FR2 having a negative refractive power, and a third front lens unit FR3 having a positive refractive power. The second front lens unit FR2 is an image stabilizing lens unit configured to move in a direction having a component perpendicular to the optical axis to perform image stabilization by shifting. In Example 2, the first front lens unit FR1 consists of a positive lens, a positive lens, a cemented lens formed of a positive lens and a negative lens, and a positive lens. The second front lens unit FR2 consists of a negative lens, a positive lens, and a negative lens. The third front lens unit FR3 consists of a positive lens. The rear lens unit RR includes a positive lens, a negative lens, a positive lens, a positive lens, a negative lens, and a positive lens.

Figure 6A:
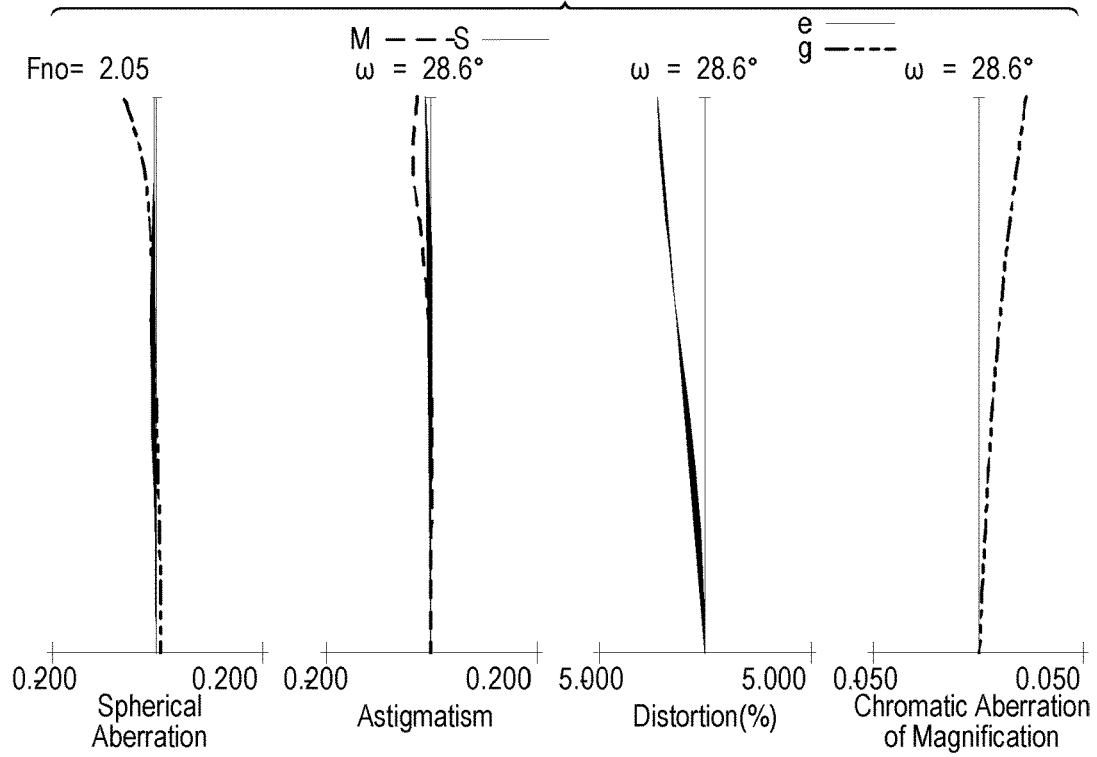
FIG. 6A is a longitudinal aberration diagram of the zoom lens according to Numerical Example 2 when focusing on the object at infinity at the wide-angle end.
Figure 6B:
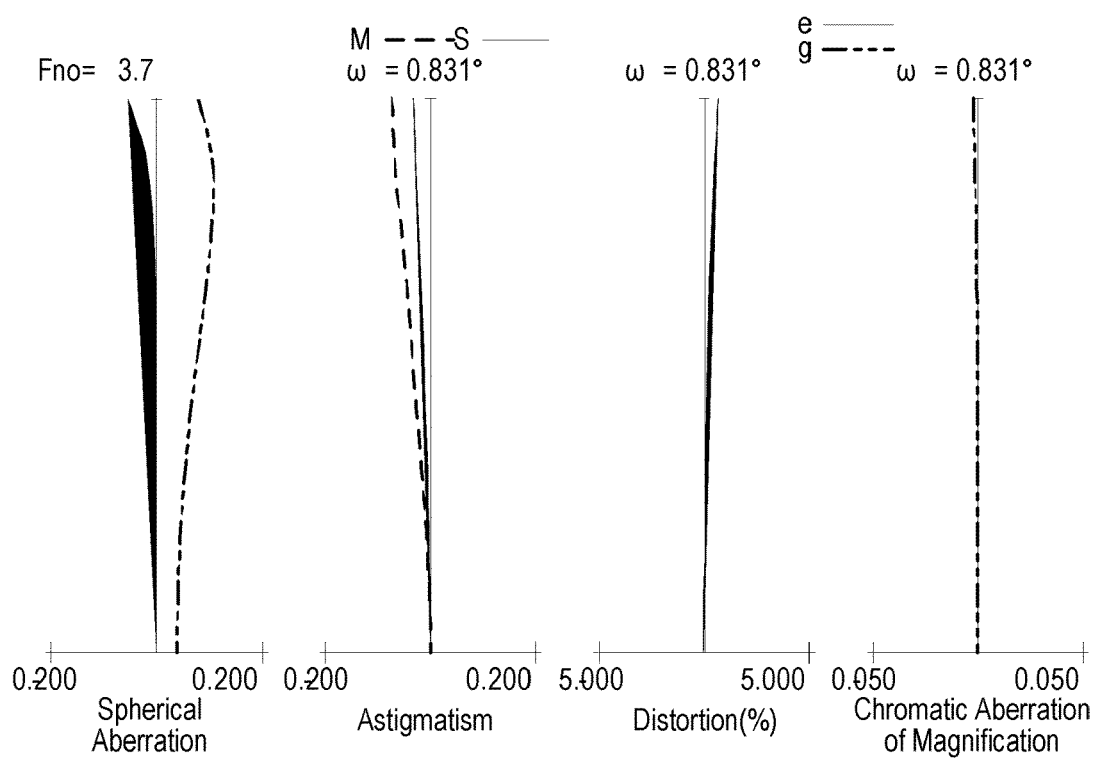
FIG. 6B is a longitudinal aberration diagram of the zoom lens according to Numerical Example 2 when focusing on the object at infinity at a telephoto end.
Figure 7A:
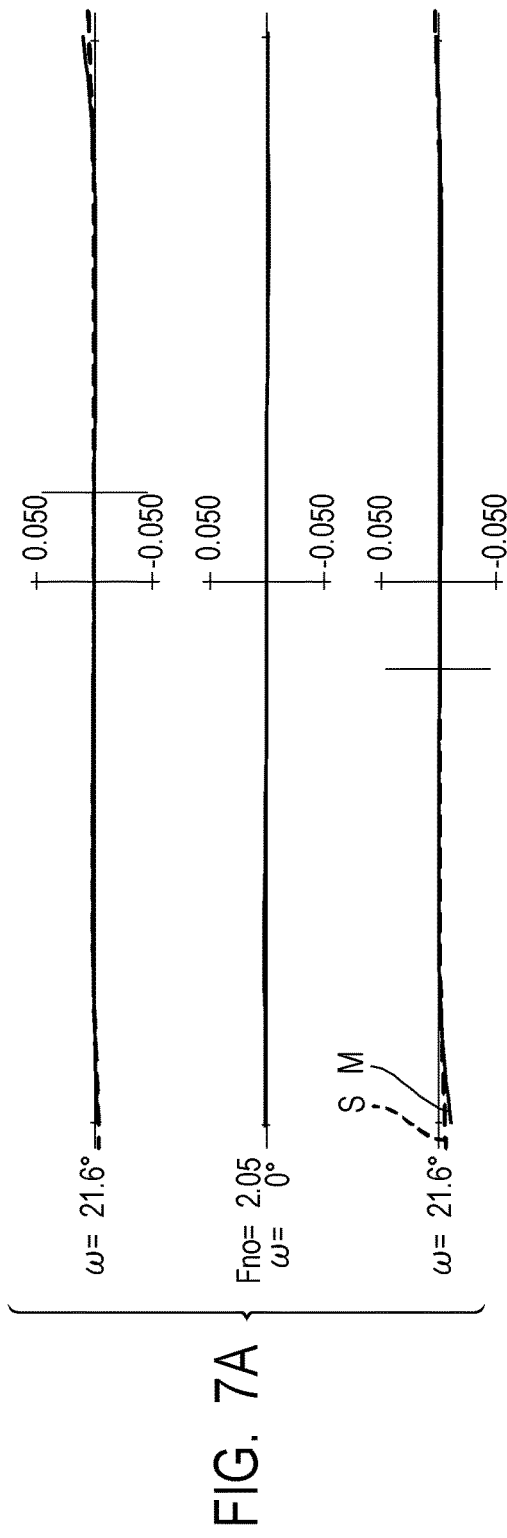
FIG. 7A is a lateral aberration diagram of the zoom lens according to Numerical Example 2 when focusing on the object at infinity at the wide-angle end with image heights of 0 mm and ±4 mm.
Figure 7B:
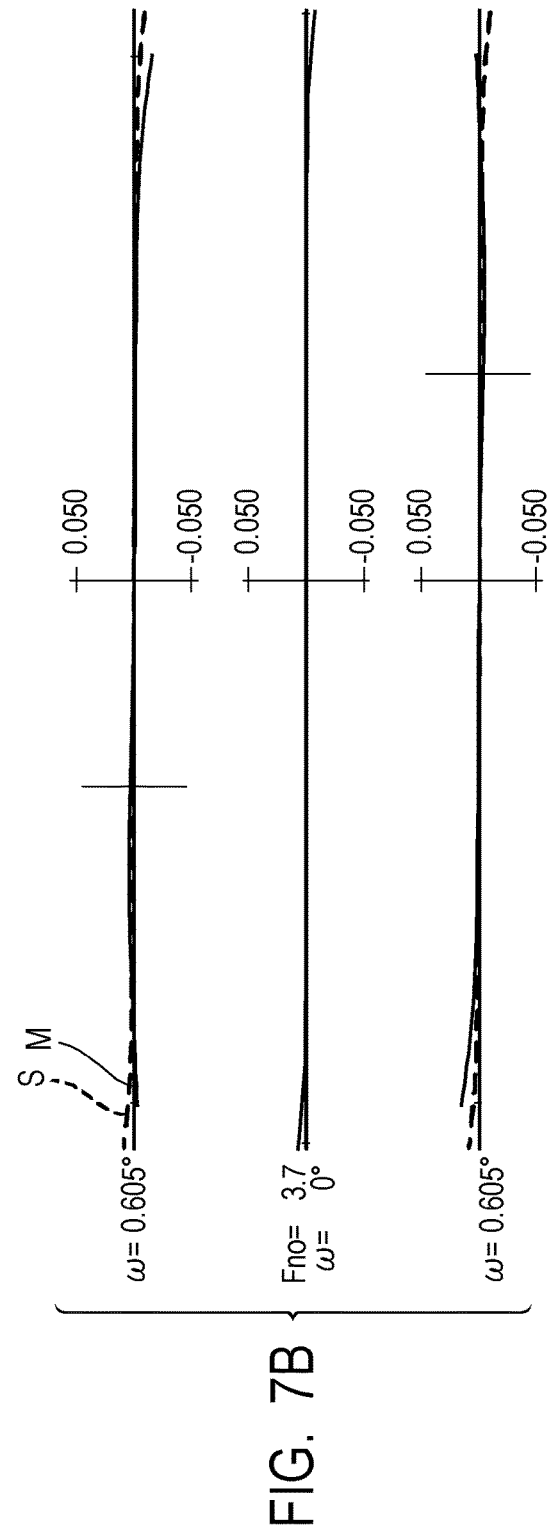
FIG. 7B is a lateral aberration diagram of the zoom lens according to Numerical Example 2 when focusing on the object at infinity at the telephoto end with the image heights of 0 mm and ±4 mm.
Figure 8A:
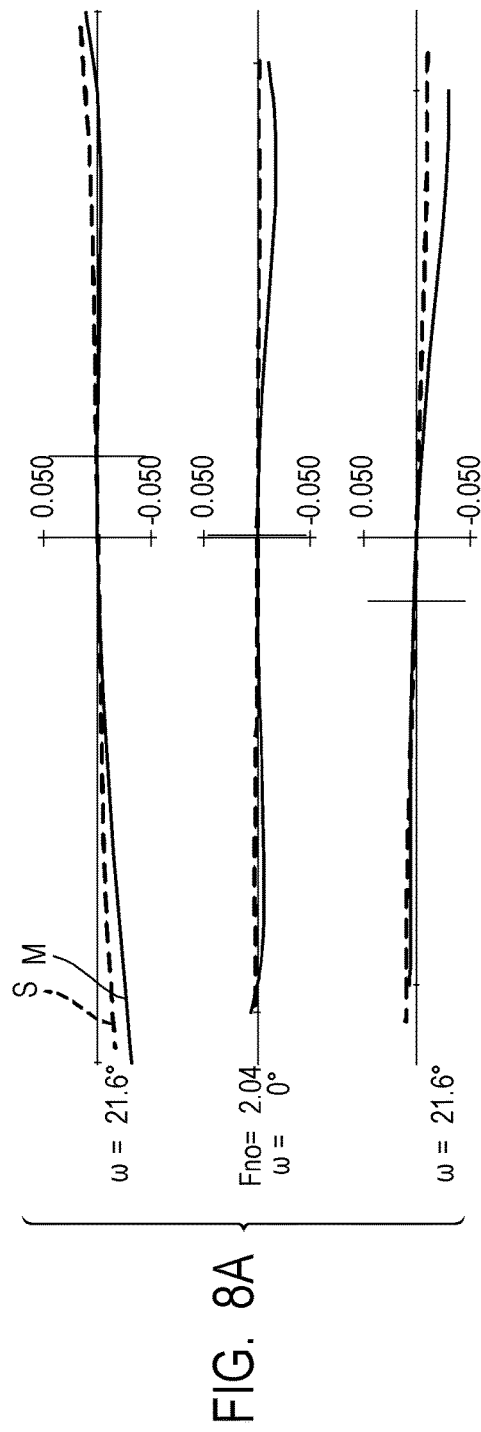
FIG. 8A is a lateral aberration diagram of the zoom lens according to Numerical Example 2 when focusing on the object at infinity at the wide-angle end and when an image stabilizing lens unit is shifted by 1 mm with the image heights of 0 mm and ±4 mm.
Figure 8B:
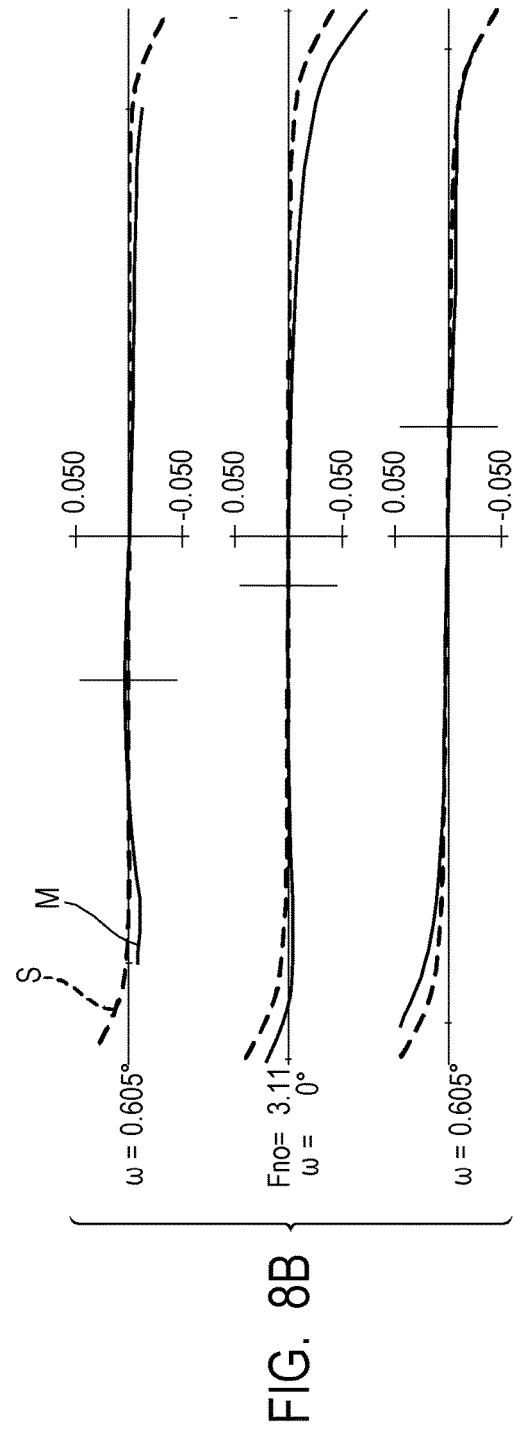
FIG. 8B is a lateral aberration diagram of the zoom lens according to Numerical Example 2 when focusing on the object at infinity at the telephoto end and when the image stabilizing lens unit is shifted by 1 mm with the image heights of 0 mm and ±4 mm.

FIG. 6A and FIG. 6B are longitudinal aberration diagrams when focusing on the object at infinity at the wide-angle end and the telephoto end, respectively. FIG. 7A is a lateral aberration diagram when focusing on the object at infinity at the wide-angle end with image heights of 0 mm and ±4 mm. FIG. 7B is a lateral aberration diagram when focusing on the object at infinity at the telephoto end with the image heights of 0 mm and ±4 mm. FIG. 8A is a lateral aberration diagram when focusing on the object at infinity at the wide-angle end and when the image stabilizing lens unit is shifted by 1 mm with the image heights of 0 mm and ±4 mm. FIG. 8B is a lateral aberration diagram when focusing on the object at infinity at the telephoto end and when the image stabilizing lens unit is shifted by 1 mm with the image heights of 0 mm and ±4 mm. It can be seen that the high optical performance can be achieved over the zooming range even during image stabilization.

In Table 1, values corresponding to the respective conditional expressions for the zoom lens according to Example 2 are shown. The zoom lens according to Example 2 satisfies the conditional expressions (1) to (4). As a result, there can be provided the zoom lens and an image pickup apparatus having the high optical performance over the entire zooming range even during image stabilization, which are small and lightweight as the entire mechanism.

Example 3

Figure 9:
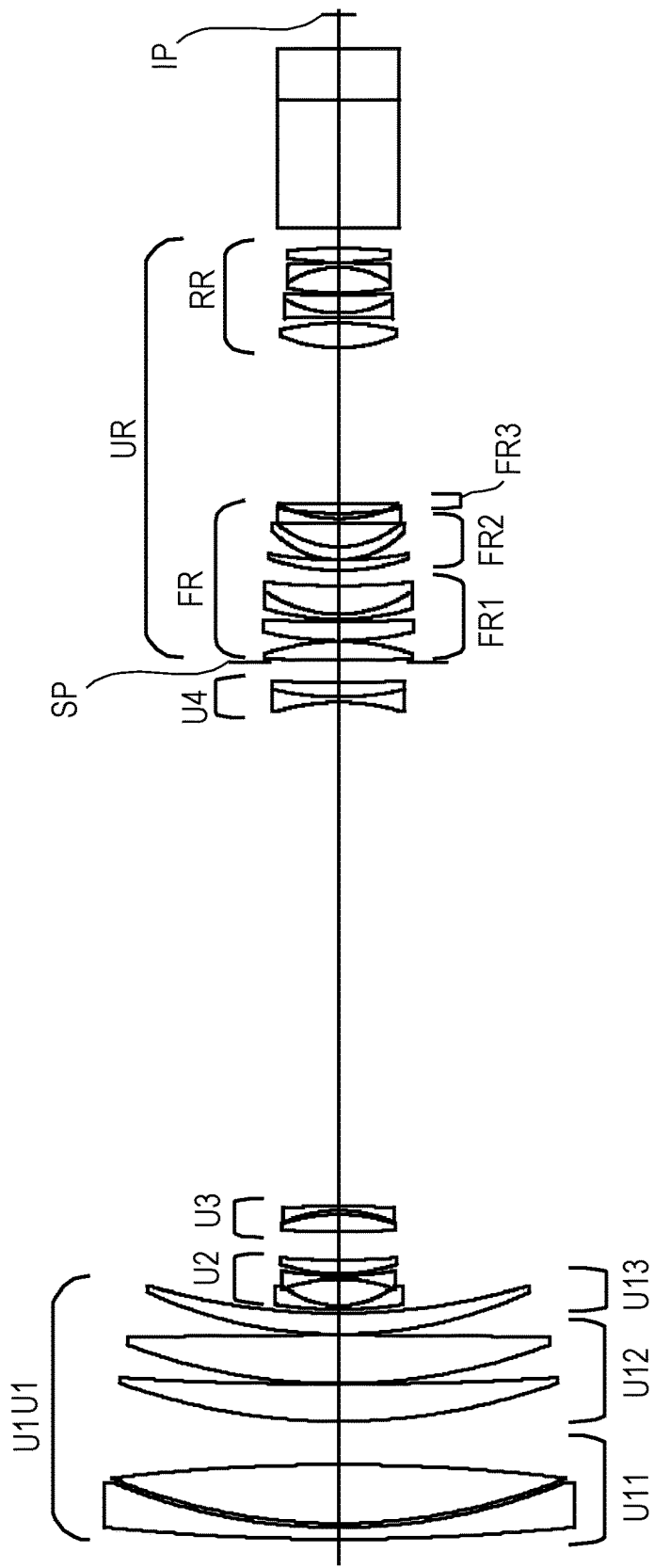
FIG. 9 is a lens cross-sectional view of a zoom lens according to Numerical Example 3 of the present invention when focusing on an object at infinity at a wide-angle end.

FIG. 9 is a lens cross-sectional view of a zoom lens according to Example 3 of the present invention when focusing on an object at infinity at a wide-angle end. The zoom lens according to Example 3 includes, in order from an object side to an image side, a first lens unit U1 having a positive refractive power, a second lens unit U2 having a negative refractive power, a third lens unit U3 having a positive refractive power, a fourth lens unit U4 having a negative refractive power, an aperture stop SP, and a fixed lens unit UR having a positive refractive power. An image plane IP corresponds to an image pickup surface of an image pickup element.

The first lens unit U1 is configured not to move for zooming. A first lens sub unit U11 includes, in order from the object side, a negative lens and a positive lens. The first lens sub unit U11 is fixed during focusing. A second lens sub unit U12 includes, in order from the object side, a positive lens and a positive lens. The second lens sub unit U12 extends toward the object side when focusing on proximity. A third lens sub unit U13 includes a positive lens. The third lens sub unit U13 extends toward the object side when focusing on proximity. The second lens sub unit U12 and the third lens sub unit U13 are configured to move along different loci during focusing from the object at infinity to a close distance object.

The second lens unit U2 is a variator lens unit, which is configured to move toward the image side during zooming from the wide-angle end to the telephoto end. The third lens unit U3 and the fourth lens unit U4 are configured to move during zooming. The fixed lens unit UR is configured not to move for zooming.

Configurations of the respective lens units in Example 3 are described. In the following, it is assumed that respective lenses are arranged in order from the object side to the image side. The first lens unit U1 includes a negative lens and four positive lenses. The second lens unit U2 includes a negative lens, a negative lens, and a positive lens. The third lens unit U3 includes a positive lens and a negative lens. The fourth lens unit U4 includes a cemented lens formed of a negative lens and a positive lens. The fixed lens unit UR is separated into a front lens unit FR and a rear lens unit RR with the longest air interval. The front lens unit FR consists of a first front lens unit FR1 having a positive refractive power, a second front lens unit FR2 having a negative refractive power, and a third front lens unit FR3 having a positive refractive power. The second front lens unit FR2 is an image stabilizing lens unit configured to move in a direction having a component perpendicular to the optical axis to perform image stabilization by shifting. In Example 3, the first front lens unit FR1 consists of a positive lens, a positive lens, and a cemented lens formed of a negative lens and a positive lens. The second front lens unit FR2 consists of a positive lens, a positive lens, and a negative lens. The third front lens unit FR3 consists of a positive lens. The rear lens unit RR includes a positive lens, a negative lens, a positive lens, a positive lens, a negative lens, and a positive lens.

Figure 10A:
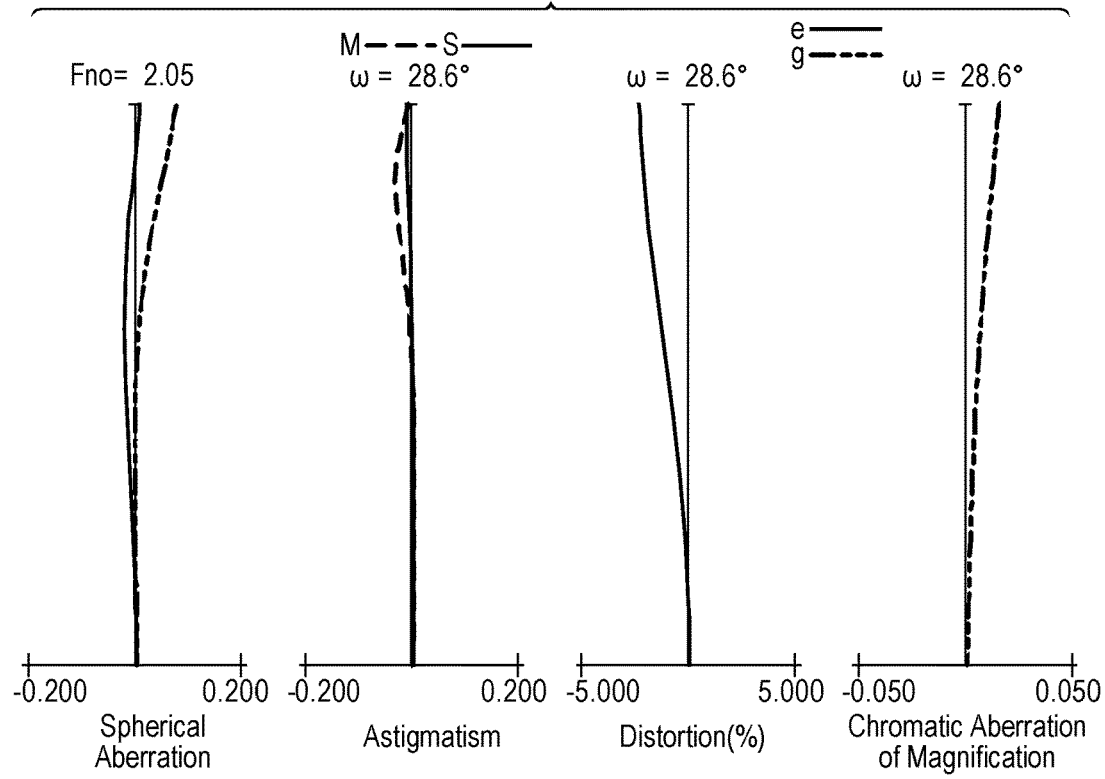
FIG. 10A is a longitudinal aberration diagram of the zoom lens according to Numerical Example 3 when focusing on the object at infinity at the wide-angle end.
Figure 10B:
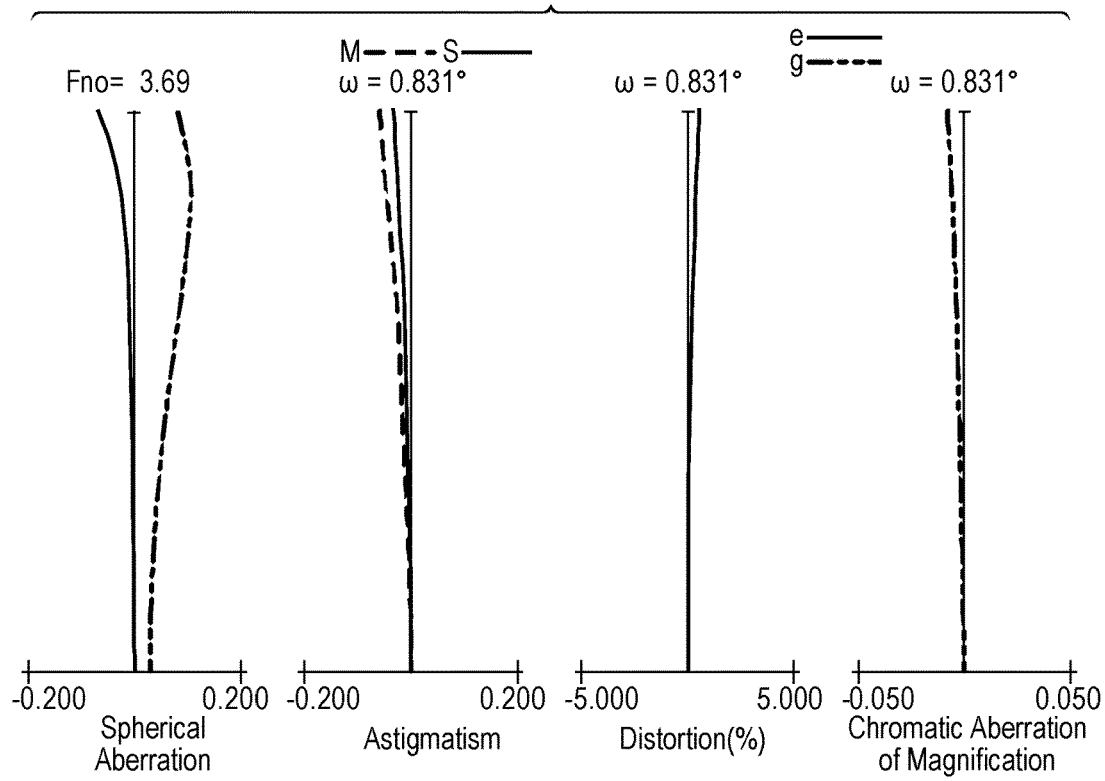
FIG. 10B is a longitudinal aberration diagram of the zoom lens according to Numerical Example 3 when focusing on the object at infinity at a telephoto end.
Figure 12A:
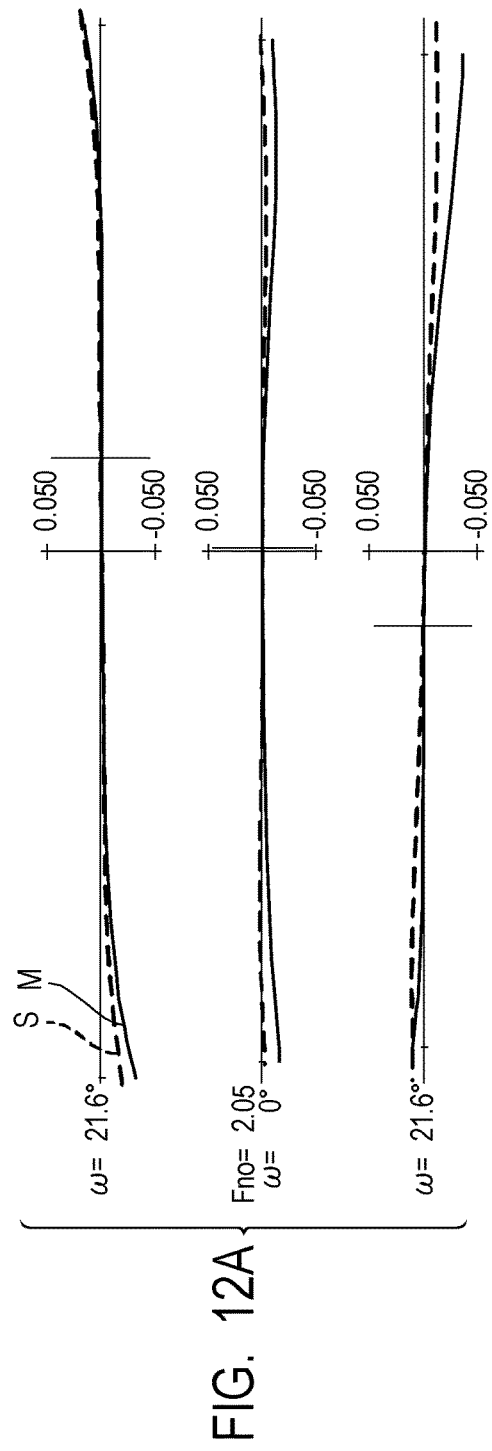
FIG. 12A is a lateral aberration diagram of the zoom lens according to Numerical Example 3 when focusing on the object at infinity at the wide-angle end and when an image stabilizing lens unit is shifted by 1 mm with the image heights of 0 mm and ±4 mm.
Figure 12B:
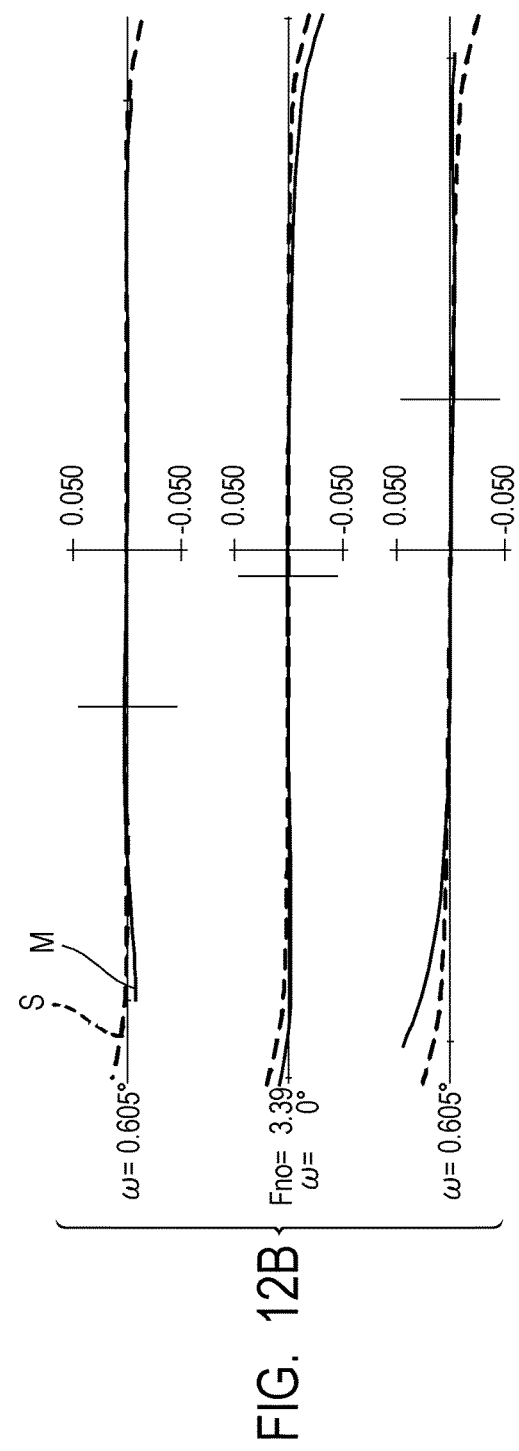
FIG. 12B is a lateral aberration diagram of the zoom lens according to Numerical Example 3 when focusing on the object at infinity at the telephoto end and when the image stabilizing lens unit is shifted by 1 mm with the image heights of 0 mm and ±4 mm.

FIG. 10A and FIG. 10B are longitudinal aberration diagrams when focusing on the object at infinity at the wide-angle end and the telephoto end, respectively. FIG. 11A is a lateral aberration diagram when focusing on the object at infinity at the wide-angle end with image heights of 0 mm and ±4 mm. FIG. 11B is a lateral aberration diagram when focusing on the object at infinity at the telephoto end with the image heights of 0 mm and ±4 mm. FIG. 12A is a lateral aberration diagram when focusing on the object at infinity at the wide-angle end and when the image stabilizing lens unit is shifted by 1 mm with the image heights of 0 mm and ±4 mm. FIG. 12B is a lateral aberration diagram when focusing on the object at infinity at the telephoto end and when the image stabilizing lens unit is shifted by 1 mm with the image heights of 0 mm and ±4 mm. It can be seen that the high optical performance can be achieved over the zooming range even during image stabilization.

In Table 1, values corresponding to the respective conditional expressions for the zoom lens according to Example 3 are shown. The zoom lens according to Example 3 satisfies the conditional expressions (1) to (4). As a result, there can be provided the zoom lens and an image pickup apparatus having the high optical performance over the entire zooming range even during image stabilization, which are small and lightweight as the entire mechanism.

Example 4

Figure 13:
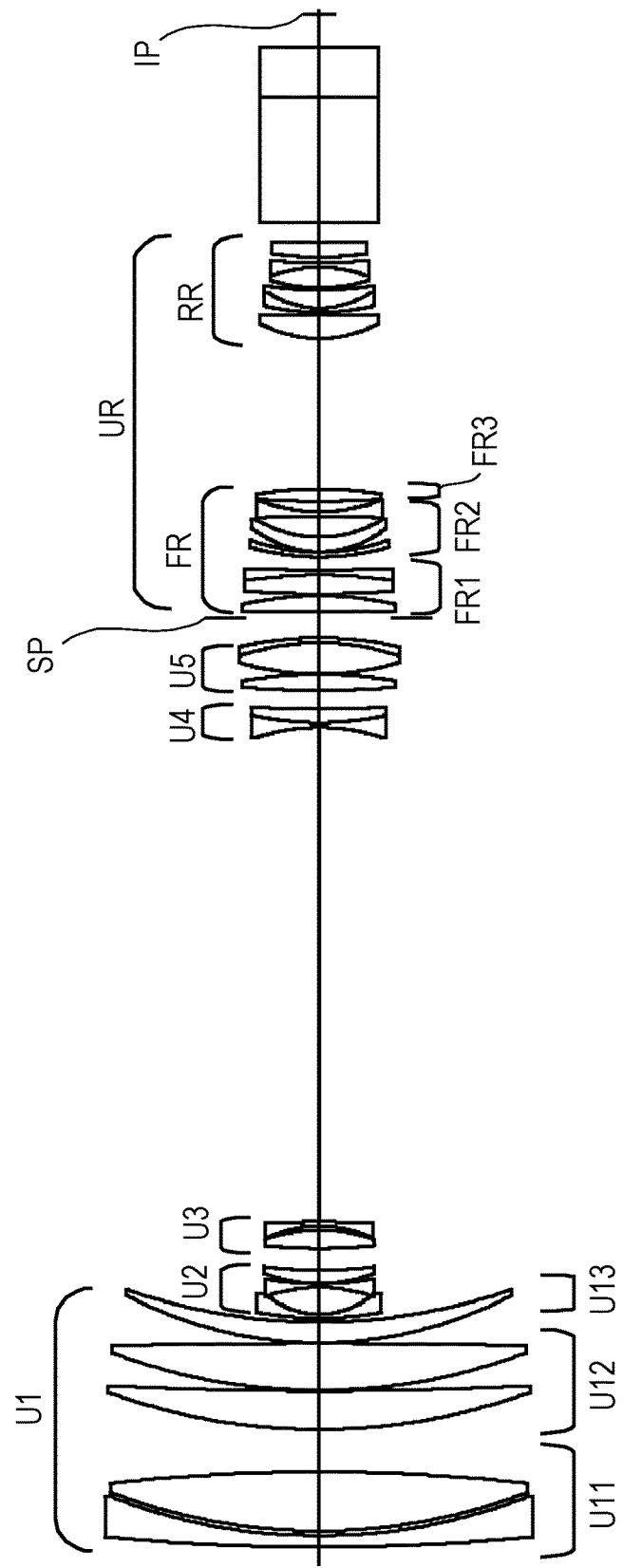
FIG. 13 is a lens cross-sectional view of a zoom lens according to Numerical Example 4 of the present invention when focusing on an object at infinity at a wide-angle end.

FIG. 13 is a lens cross-sectional view of a zoom lens according to Example 4 of the present invention when focusing on an object at infinity at a wide-angle end. The zoom lens according to Example 4 includes, in order from an object side to an image side, a first lens unit U1 having a positive refractive power, a second lens unit U2 having a negative refractive power, a third lens unit U3 having a positive refractive power, a fourth lens unit U4 having a negative refractive power, a fifth lens unit U5 having a positive refractive power, an aperture stop SP, and a fixed lens unit UR having a positive refractive power. An image plane IP corresponds to an image pickup surface of an image pickup element (photoelectric converter).

The first lens unit U1 is configured not to move for zooming. A first lens sub unit U11 includes, in order from the object side, a negative lens and a positive lens. The first lens sub unit U11 is fixed during focusing. A second lens sub unit U12 includes, in order from the object side, a positive lens and a positive lens. The second lens sub unit U12 extends toward the object side when focusing on proximity. A third lens sub unit U13 includes a positive lens. The third lens sub unit U13 extends toward the object side when focusing on proximity. The second lens sub unit U12 and the third lens sub unit U13 are configured to move along different loci during focusing from the object at infinity to a close distance object.

The second lens unit U2 is a variator lens unit, which is configured to move toward the image side during zooming from the wide-angle end (short focal length end) to the telephoto end (long focal length end). The third lens unit U3, the fourth lens unit U4, and the fifth lens unit U5 are configured to move during zooming. The fifth lens unit U5 is configured to move in synchronization with the second lens unit U2 to correct an image plane variation accompanying zooming. The fixed lens unit UR is configured not to move for zooming.

Configurations of the respective lens units in Example 4 are described. In the following, it is assumed that respective lenses are arranged in order from the object side to the image side. The first lens unit U1 includes a negative lens and four positive lenses. The second lens unit U2 includes a negative lens, a negative lens, and a positive lens. The third lens unit U3 includes a positive lens and a negative lens. The fourth lens unit U4 includes a cemented lens formed of a negative lens and a positive lens. The fifth lens unit U5 includes a positive lens and a cemented lens formed of a positive lens and a negative lens. The fixed lens unit UR is separated into a front lens unit FR and a rear lens unit RR with the longest air interval. The front lens unit FR consists of a first front lens unit FR1 having a positive refractive power, a second front lens unit FR2 having a negative refractive power, and a third front lens unit FR3 having a positive refractive power. The second front lens unit FR2 is an image stabilizing lens unit configured to move in a direction having a component perpendicular to the optical axis to perform image stabilization by shifting. In Example 4, the first front lens unit FR1 consists of a positive lens and a cemented lens formed of a positive lens and a negative lens. The second front lens unit FR2 consists of a negative lens, a positive lens, and a negative lens. The third front lens unit FR3 consists of a positive lens. The rear lens unit RR includes a positive lens, a negative lens, a positive lens, a positive lens, a negative lens, and a positive lens.

Figure 16A:
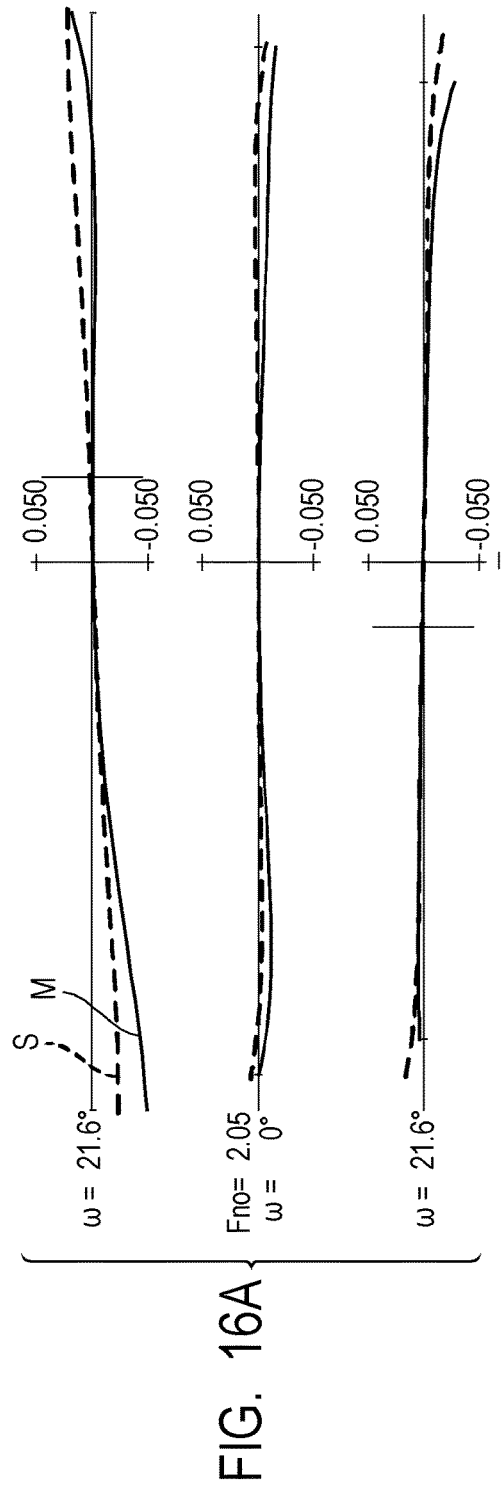
FIG. 16A is a lateral aberration diagram of the zoom lens according to Numerical Example 4 when focusing on the object at infinity at the wide-angle end and when an image stabilizing lens unit is shifted by 1 mm with the image heights of 0 mm and ±4 mm.
Figure 16B:
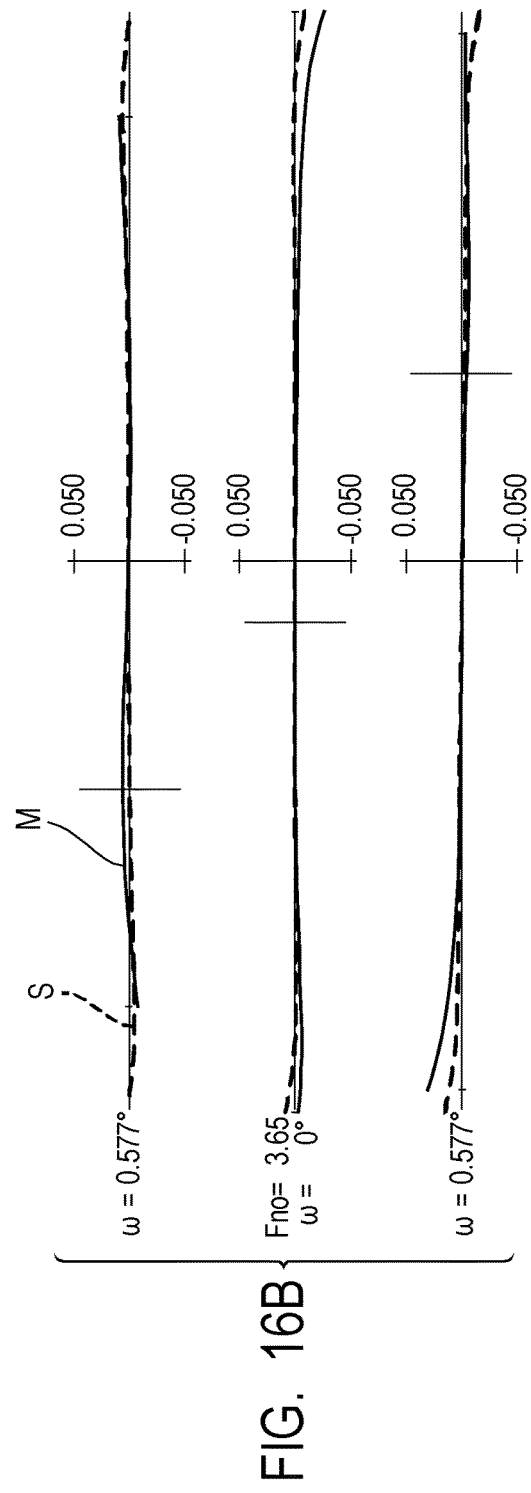
FIG. 16B is a lateral aberration diagram of the zoom lens according to Numerical Example 4 when focusing on the object at infinity at the telephoto end and when the image stabilizing lens unit is shifted by 1 mm with the image heights of 0 mm and ±4 mm.

FIG. 14A and FIG. 14B are longitudinal aberration diagrams when focusing on the object at infinity at the wide-angle end and the telephoto end, respectively. FIG. 15A is a lateral aberration diagram when focusing on the object at infinity at the wide-angle end with image heights of 0 mm and ±4 mm. FIG. 15B is a lateral aberration diagram when focusing on the object at infinity at the telephoto end with the image heights of 0 mm and ±4 mm. FIG. 16A is a lateral aberration diagram when focusing on the object at infinity at the wide-angle end and when the image stabilizing lens unit is shifted by 1 mm with the image heights of 0 mm and ±4 mm. FIG. 16B is a lateral aberration diagram when focusing on the object at infinity at the telephoto end and when the image stabilizing lens unit is shifted by 1 mm with the image heights of 0 mm and ±4 mm. It can be seen that the high optical performance can be achieved over the zooming range even during image stabilization.

In Table 1, values corresponding to the respective conditional expressions for the zoom lens according to Example 4 are shown. The zoom lens according to Example 4 satisfies the conditional expressions (1) to (4). As a result, there can be provided the zoom lens and an image pickup apparatus having the high optical performance over the entire zooming range even during image stabilization, which are small and lightweight as the entire mechanism.

Example 5

Figure 17:
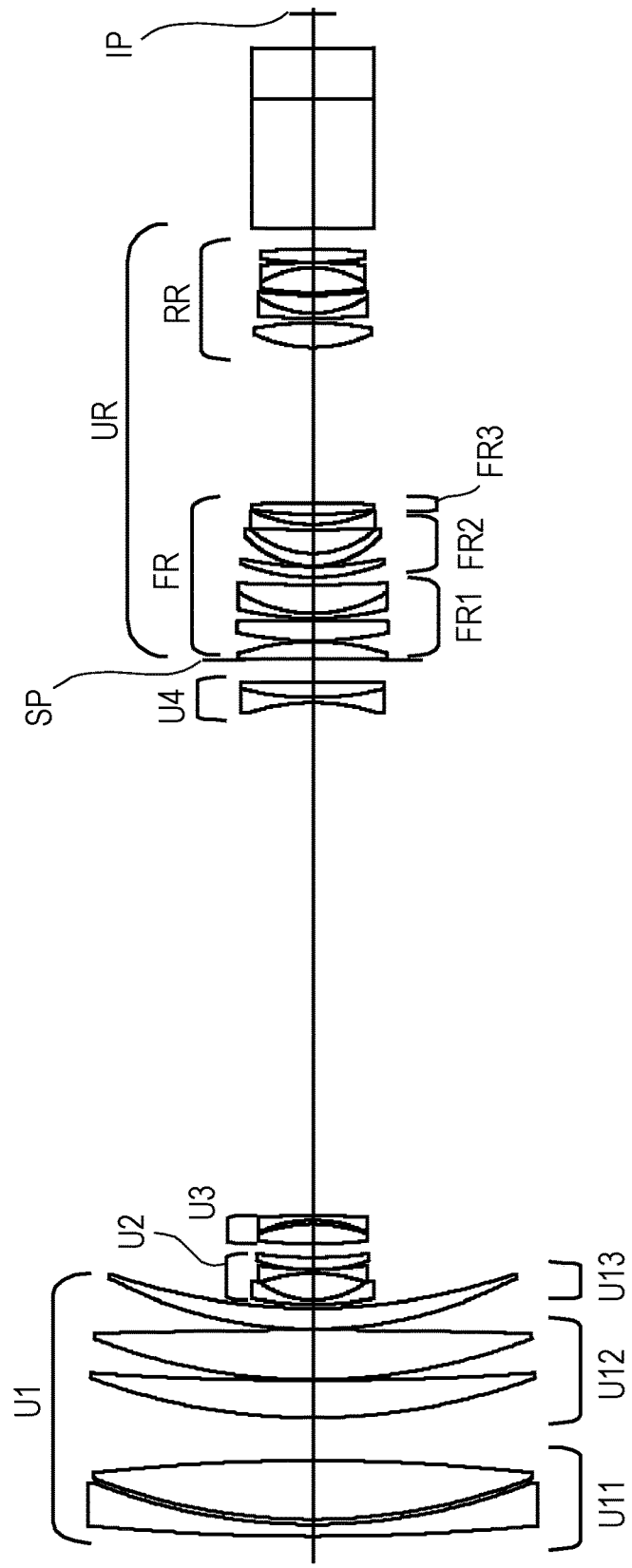
FIG. 17 is a lens cross-sectional view of a zoom lens according to Numerical Example 5 of the present invention when focusing on an object at infinity at a wide-angle end.

FIG. 17 is a lens cross-sectional view of a zoom lens according to Example 5 of the present invention when focusing on an object at infinity at a wide-angle end. The zoom lens according to Example 5 includes, in order from an object side to an image side, a first lens unit U1 having a positive refractive power, a second lens unit U2 having a negative refractive power, a third lens unit U3 having a positive refractive power, a fourth lens unit U4 having a negative refractive power, an aperture stop SP, and a fixed lens unit UR having a positive refractive power. An image plane IP corresponds to an image pickup surface of an image pickup element.

The first lens unit U1 is configured to move toward the object side during zooming from the wide-angle end to the telephoto end. A first lens sub unit U11 includes, in order from the object side, a negative lens and a positive lens. The first lens sub unit U11 is fixed during focusing. A second lens sub unit U12 includes, in order from the object side, a positive lens and a positive lens. The second lens sub unit U12 extends toward the object side when focusing on proximity. A third lens sub unit U13 includes a positive lens. The third lens sub unit U13 extends toward the object side when focusing on proximity. The second lens sub unit U12 and the third lens sub unit U13 are configured to move along different loci during focusing from the object at infinity to a close distance object.

The second lens unit U2 is a variator lens unit, which is configured to move toward the image side during zooming from the wide-angle end to the telephoto end. The third lens unit U3 and the fourth lens unit U4 are configured to move during zooming. The fixed lens unit UR is configured not to move for zooming.

Configurations of the respective lens units in Example 5 are described. In the following, it is assumed that respective lenses are arranged in order from the object side to the image side. The first lens unit U1 includes a negative lens and four positive lenses. The second lens unit U2 includes a negative lens, a negative lens, and a positive lens. The third lens unit U3 includes a positive lens and a negative lens. The fourth lens unit U4 includes a cemented lens formed of a negative lens and a positive lens. The fixed lens unit UR is separated into a front lens unit FR and a rear lens unit RR with the longest air interval. The front lens unit FR consists of a first front lens unit FR1 having a positive refractive power, a second front lens unit FR2 having a negative refractive power, and a third front lens unit FR3 having a positive refractive power. The second front lens unit FR2 is an image stabilizing lens unit configured to move in a direction having a component perpendicular to the optical axis to perform image stabilization by shifting. In Example 5, the first front lens unit FR1 consists of a positive lens, a positive lens, and a cemented lens formed of a positive lens and a negative lens. The second front lens unit FR2 consists of a positive lens, a positive lens, and a negative lens. The third front lens unit FR3 consists of a positive lens. The rear lens unit RR includes a positive lens, a negative lens, a positive lens, a positive lens, a negative lens, and a positive lens.

Figure 18A:
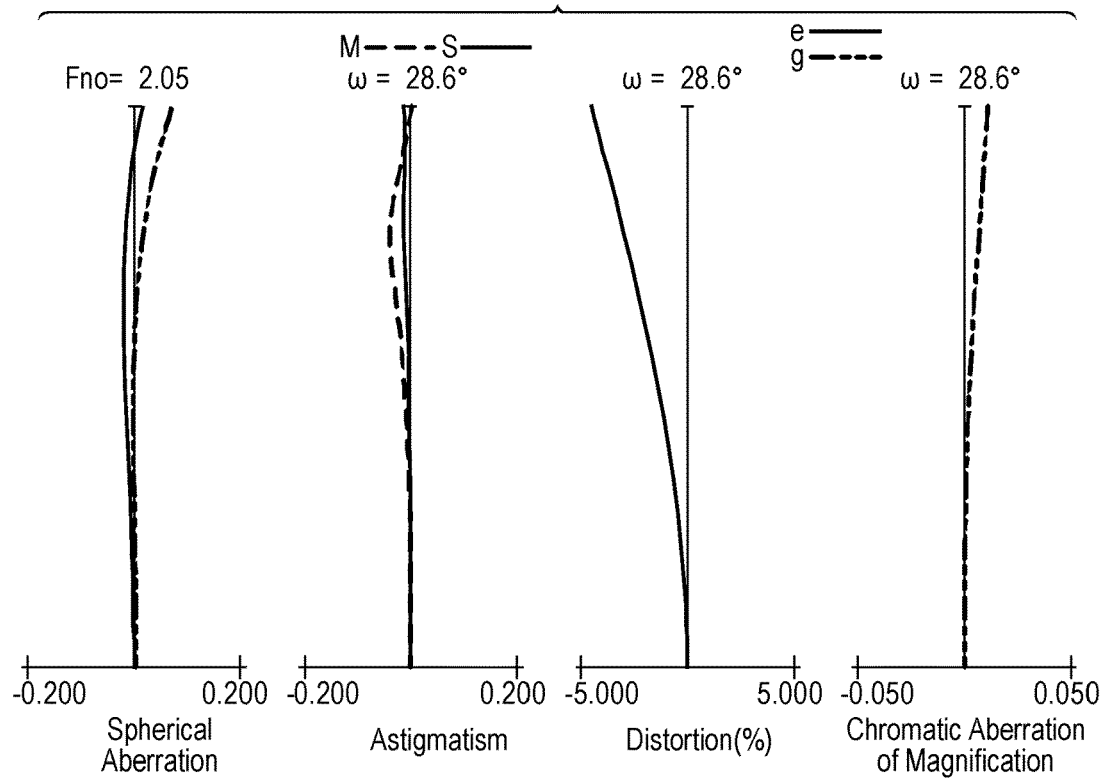
FIG. 18A is a longitudinal aberration diagram of the zoom lens according to Numerical Example 5 when focusing on the object at infinity at the wide-angle end.
Figure 18B:
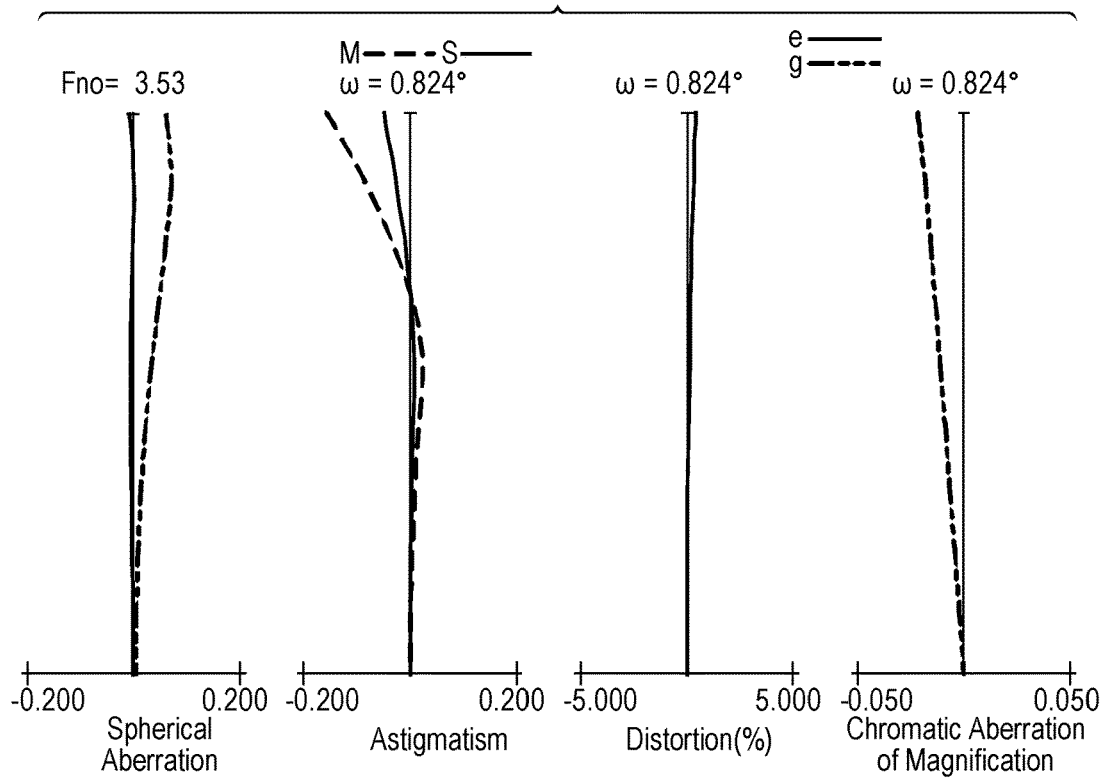
FIG. 18B is a longitudinal aberration diagram of the zoom lens according to Numerical Example 5 when focusing on the object at infinity at a telephoto end.
Figure 20A:
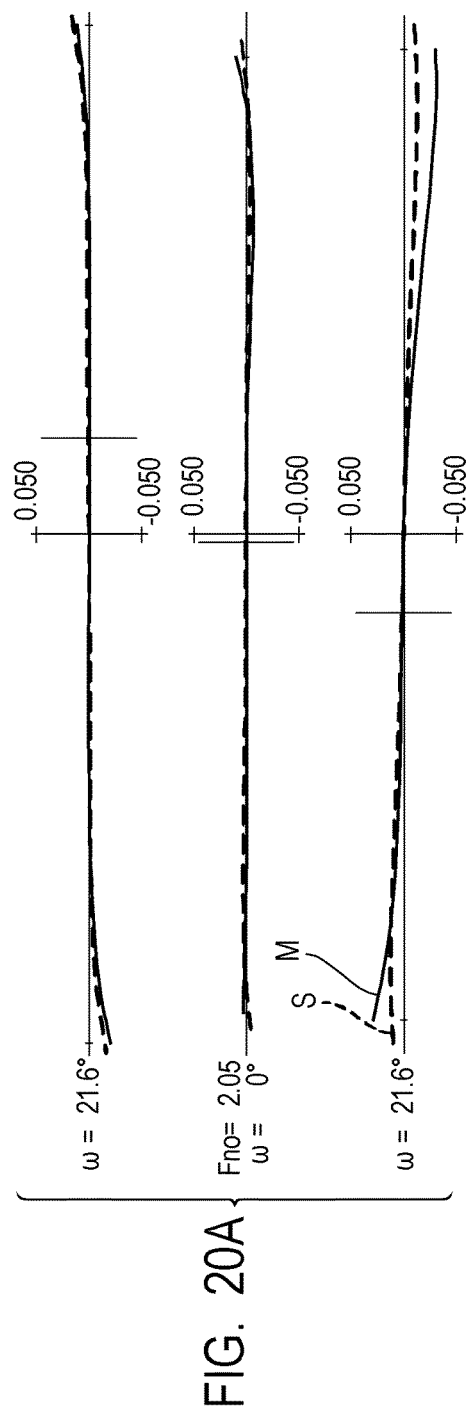
FIG. 20A is a lateral aberration diagram of the zoom lens according to Numerical Example 5 when focusing on the object at infinity at the wide-angle end and when an image stabilizing lens unit is shifted by 1 mm with the image heights of 0 mm and ±4 mm.
Figure 20B:
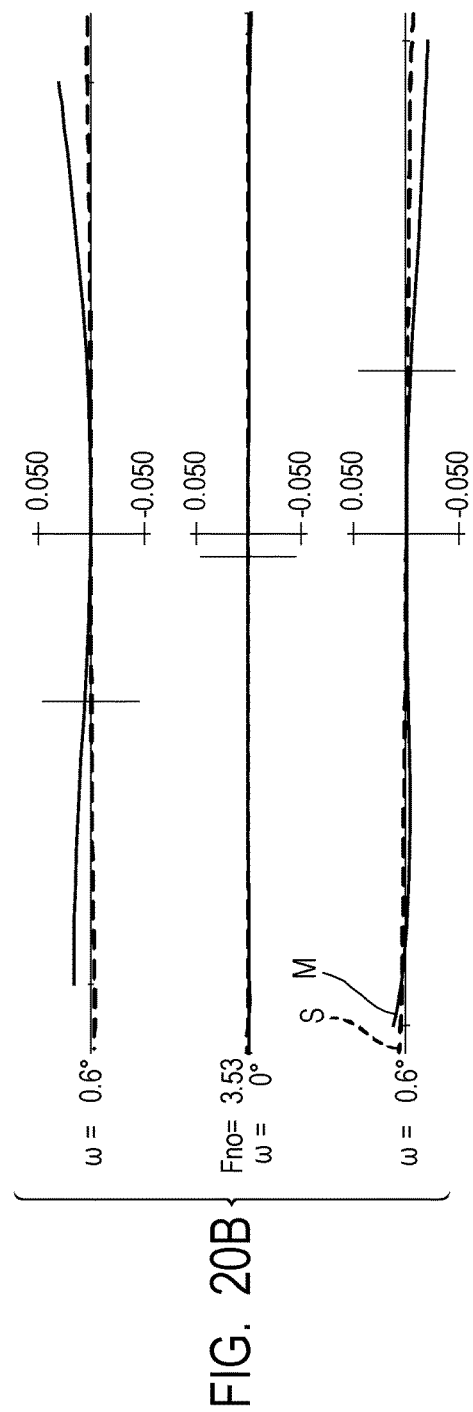
FIG. 20B is a lateral aberration diagram of the zoom lens according to Numerical Example 5 when focusing on the object at infinity at the telephoto end and when the image stabilizing lens unit is shifted by 1 mm with the image heights of 0 mm and ±4 mm.

FIG. 18A and FIG. 18B are longitudinal aberration diagrams when focusing on the object at infinity at the wide-angle end and the telephoto end, respectively. FIG. 19A is a lateral aberration diagram when focusing on the object at infinity at the wide-angle end with image heights of 0 mm and ±4 mm. FIG. 19B is a lateral aberration diagram when focusing on the object at infinity at the telephoto end with the image heights of 0 mm and ±4 mm. FIG. 20A is a lateral aberration diagram when focusing on the object at infinity at the wide-angle end and when the image stabilizing lens unit is shifted by 1 mm with the image heights of 0 mm and ±4 mm. FIG. 20B is a lateral aberration diagram when focusing on the object at infinity at the telephoto end and when the image stabilizing lens unit is shifted by 1 mm with the image heights of 0 mm and ±4 mm. It can be seen that the high optical performance can be achieved over the zooming range even during image stabilization.

In Table 1, values corresponding to the respective conditional expressions for the zoom lens according to Example 5 are shown. The zoom lens according to Example 5 satisfies the conditional expressions (1) to (4). As a result, there can be provided the zoom lens and an image pickup apparatus having the high optical performance over the entire zooming range even during image stabilization, which are small and lightweight as the entire mechanism.

In the following Numerical Examples, i represents the order of a surface from the object side, ri represents a curvature radius of an i-th surface from the object side, di represents an interval between the i-th surface and the (i+1)-th surface from the object side, and ndi and vdi represent a refractive index and an Abbe number of an optical member having the i-th surface and the (i+1)-th surface, respectively. BF represents an air-equivalent back focus.

An Abbe number vd of a material of an optical element (lens) with respect to a d-line is expressed as follows:

$$vd = (nd-1)/(nF-nC) \quad (5),$$

where nF, nd, and nC are refractive indices of an F-line (486.1 nm), the d-line (587.6 nm), and a C-line (656.3 nm) of Fraunhofer lines, respectively.

The aspherical shape is expressed in the following expression, where an X axis corresponds to the optical axis direction, an H axis corresponds to a direction perpendicular to the optical axis, a traveling direction of light corresponds to a positive direction, R represents a paraxial radius of curvature, k represents a conic constant, and each of A4, A6, and A8 represents an aspherical coefficient.

$$X = \frac{H^2/R}{1+\sqrt{1-(1+k)(H/R)^2}} + A4H^4 + A6H^6 + A8H^8 \quad (6)$$

In Numerical Examples, e-Z means $\times 10^{-Z}$. The asterisk (*) attached to the right of the surface number indicates that the surface is aspherical.

Numerical Example 1

| | | Unit: mm | | |
|---|---|---|---|---|
| | | Surface data | | |
| Surface number i | ri | di | ndi | vdi |
| 1 | 590.424 | 3.00 | 1.83481 | 42.7 |
| 2 | 150.235 | 1.13 | | |
| 3 | 152.134 | 15.19 | 1.43387 | 95.1 |
| 4 | −490.638 | 11.26 | | |
| 5 | 164.666 | 9.55 | 1.43387 | 95.1 |
| 6 | 930.648 | 0.20 | | |
| 7 | 151.351 | 12.60 | 1.43387 | 95.1 |
| 8 | −2,190.322 | 0.19 | | |
| 9 | 116.382 | 5.44 | 1.43387 | 95.1 |
| 10 | 173.363 | (Variable) | | |
| 11 | 103.098 | 1.00 | 2.00100 | 29.1 |
| 12 | 23.602 | 6.65 | | |
| 13 | −42.186 | 0.90 | 1.77250 | 49.6 |
| 14 | 79.642 | 0.52 | | |
| 15 | 46.767 | 3.56 | 1.95906 | 17.5 |
| 16 | 184.467 | (Variable) | | |
| 17 | 219.154 | 4.47 | 1.80810 | 22.8 |
| 18 | −45.130 | 1.00 | | |
| 19 | −34.174 | 1.10 | 1.80100 | 35.0 |
| 20 | −265.227 | (Variable) | | |
| 21 | −55.168 | 1.30 | 1.71999 | 50.2 |
| 22 | 71.954 | 3.96 | 1.84666 | 23.9 |
| 23 | 743.240 | (Variable) | | |
| 24 (Stop) | ∞ | 0.50 | | |
| 25 | 1,059.003 | 4.01 | 1.60311 | 60.6 |
| 26 | −71.535 | 0.20 | | |
| 27 | 141.410 | 4.82 | 1.48749 | 70.2 |
| 28 | −307.395 | 0.50 | | |
| 29 | 128.099 | 7.89 | 1.49700 | 81.5 |
| 30 | −51.867 | 1.30 | 1.84666 | 23.9 |
| 31 | −127.042 | 0.50 | | |
| 32 | −104.723 | 2.48 | 1.51633 | 64.1 |
| 33 | −106.190 | 3.00 | | |
| 34 | −149.609 | 1.30 | 1.81600 | 46.6 |
| 35 | −231.108 | 0.15 | | |
| 36 | 42.850 | 3.50 | 1.84666 | 23.8 |
| 37 | 54.702 | 2.35 | | |
| 38 | 74.432 | 1.30 | 1.77250 | 49.6 |
| 39 | 45.454 | 5.00 | | |
| 40 | −9,605.266 | 2.80 | 1.51633 | 64.1 |
| 41 | −491.779 | 40.00 | | |
| 42 | 37.105 | 8.29 | 1.53775 | 74.7 |
| 43 | −133.573 | 1.43 | | |
| 44 | 188.509 | 1.20 | 1.88300 | 40.8 |
| 45 | 29.343 | 8.74 | 1.54072 | 47.2 |
| 46 | 2,377.193 | 0.66 | | |

-continued

Unit: mm

| | | | | |
|---|---|---|---|---|
| 47 | 53.259 | 8.48 | 1.51633 | 64.1 |
| 48 | −31.174 | 1.20 | 1.88300 | 40.8 |
| 49 | 124.957 | 1.00 | | |
| 50 | 95.738 | 5.07 | 1.71736 | 29.5 |
| 51 | −208.082 | 5.28 | | |
| 52 | ∞ | 33.00 | 1.60859 | 46.4 |
| 53 | ∞ | 13.20 | 1.51680 | 64.2 |
| 54 | ∞ | 8.90 | | |
| Image plane | ∞ | | | |

Various data
Zoom ratio 37.60

| | | |
|---|---|---|
| Focal length | 10.08 | 379.01 |
| F-number | 2.05 | 3.70 |
| Half angle of view | 28.62 | 0.83 |
| Image height | 5.50 | 5.50 |
| Total lens length | 404.90 | 404.90 |
| BF | 8.90 | 8.90 |
| d10 | 0.99 | 123.57 |
| d16 | 7.34 | 3.07 |
| d20 | 130.33 | 15.40 |
| d23 | 5.18 | 1.80 |
| d54 | 8.90 | 8.90 |

Zooming lens unit data

| Unit | First surface | Focal length |
|---|---|---|
| 1 | 1 | 161.80 |
| 2 | 11 | −20.94 |
| 3 | 17 | 579.02 |
| 4 | 21 | −80.29 |
| 5 | 24 | 67.00 |

Numerical Example 2

Unit: mm

Surface data

| Surface number i | ri | di | ndi | νdi |
|---|---|---|---|---|
| 1 | 590.424 | 3.00 | 1.83481 | 42.7 |
| 2 | 150.235 | 1.13 | | |
| 3 | 152.134 | 15.19 | 1.43387 | 95.1 |
| 4 | −490.638 | 11.26 | | |
| 5 | 164.666 | 9.55 | 1.43387 | 95.1 |
| 6 | 930.648 | 0.20 | | |
| 7 | 151.351 | 12.60 | 1.43387 | 95.1 |
| 8 | −2,190.322 | 0.19 | | |
| 9 | 116.382 | 5.44 | 1.43387 | 95.1 |
| 10 | 173.363 | (Variable) | | |
| 11 | 103.098 | 1.00 | 2.00100 | 29.1 |
| 12 | 23.602 | 6.65 | | |
| 13 | −42.186 | 0.90 | 1.77250 | 49.6 |
| 14 | 79.642 | 0.52 | | |
| 15 | 46.767 | 3.56 | 1.95906 | 17.5 |
| 16 | 184.467 | (Variable) | | |
| 17 | 219.154 | 4.47 | 1.80810 | 22.8 |
| 18 | −45.130 | 1.00 | | |
| 19 | −34.174 | 1.10 | 1.80100 | 35.0 |
| 20 | −265.227 | (Variable) | | |
| 21 | −55.168 | 1.30 | 1.71999 | 50.2 |
| 22 | 71.954 | 3.96 | 1.84666 | 23.9 |
| 23 | 743.240 | (Variable) | | |
| 24 (Stop) | ∞ | 0.50 | | |
| 25 | 396.663 | 5.98 | 1.60311 | 60.6 |
| 26 | −57.563 | 0.20 | | |
| 27 | 119.659 | 5.70 | 1.48749 | 70.2 |
| 28 | −140.996 | 0.50 | | |
| 29 | 59.233 | 7.90 | 1.49700 | 81.5 |
| 30 | −52.745 | 1.30 | 1.84666 | 23.9 |

-continued

Unit: mm

| | | | | |
|---|---|---|---|---|
| 31 | −1,493.186 | 0.50 | | |
| 32 | −370.551 | 4.27 | 1.51633 | 64.1 |
| 33 | −71.458 | 2.00 | | |
| 34 | −98.539 | 1.30 | 1.81600 | 46.6 |
| 35 | 64.443 | 0.15 | | |
| 36 | 44.076 | 3.97 | 1.84666 | 23.8 |
| 37 | 175.964 | 1.40 | | |
| 38 | −1,070.409 | 1.30 | 1.77250 | 49.6 |
| 39 | 92.746 | 3.00 | | |
| 40 | −415.227 | 1.75 | 1.51633 | 64.1 |
| 41 | −230.666 | 40.00 | | |
| 42 | 47.376 | 7.05 | 1.54814 | 45.8 |
| 43 | −99.772 | 0.20 | | |
| 44 | 50.862 | 1.20 | 1.88300 | 40.8 |
| 45 | 31.787 | 6.93 | 1.49700 | 81.5 |
| 46 | 143.677 | 0.10 | | |
| 47 | 48.255 | 5.08 | 1.43875 | 94.9 |
| 48 | −41.398 | 1.20 | 1.88300 | 40.8 |
| 49 | 115.076 | 1.00 | | |
| 50 | 543.790 | 4.44 | 1.51742 | 52.4 |
| 51 | −208.187 | 3.80 | | |
| 52 | ∞ | 33.00 | 1.60859 | 46.4 |
| 53 | ∞ | 13.20 | 1.51680 | 64.2 |
| 54 | ∞ | 8.90 | | |
| Image plane | ∞ | | | |

Various data
Zoom ratio 37.60

| | | |
|---|---|---|
| Focal length | 10.08 | 379.02 |
| F-number | 2.05 | 3.70 |
| Half angle of view | 28.62 | 0.83 |
| Image height | 5.50 | 5.50 |
| Total lens length | 394.68 | 394.68 |
| BF | 8.90 | 8.90 |
| d10 | 0.99 | 123.57 |
| d16 | 7.34 | 3.07 |
| d20 | 130.33 | 15.40 |
| d23 | 5.18 | 1.80 |
| d54 | 8.90 | 8.90 |

Zooming lens unit data

| Unit | First surface | Focal length |
|---|---|---|
| 1 | 1 | 161.80 |
| 2 | 11 | −20.94 |
| 3 | 17 | 579.02 |
| 4 | 21 | −80.29 |
| 5 | 24 | 65.23 |

Numerical Example 3

Unit: mm

Surface data

| Surface number i | ri | di | ndi | νdi |
|---|---|---|---|---|
| 1 | 590.424 | 3.00 | 1.83481 | 42.7 |
| 2 | 150.235 | 1.13 | | |
| 3 | 152.134 | 15.19 | 1.43387 | 95.1 |
| 4 | −490.638 | 11.26 | | |
| 5 | 164.666 | 9.55 | 1.43387 | 95.1 |
| 6 | 930.648 | 0.20 | | |
| 7 | 151.351 | 12.60 | 1.43387 | 95.1 |
| 8 | −2,190.322 | 0.19 | | |
| 9 | 116.382 | 5.44 | 1.43387 | 95.1 |
| 10 | 173.363 | (Variable) | | |
| 11 | 103.098 | 1.00 | 2.00100 | 29.1 |
| 12 | 23.602 | 6.65 | | |
| 13 | −42.186 | 0.90 | 1.77250 | 49.6 |
| 14 | 79.642 | 0.52 | | |

-continued

| Unit: mm | | | | |
|---|---|---|---|---|
| 15 | 46.767 | 3.56 | 1.95906 | 17.5 |
| 16 | 184.467 | (Variable) | | |
| 17 | 219.154 | 4.47 | 1.80810 | 22.8 |
| 18 | −45.130 | 1.00 | | |
| 19 | −34.174 | 1.10 | 1.80100 | 35.0 |
| 20 | −265.227 | (Variable) | | |
| 21 | −55.168 | 1.30 | 1.71999 | 50.2 |
| 22 | 71.954 | 3.96 | 1.84666 | 23.9 |
| 23 | 743.240 | (Variable) | | |
| 24 (Stop) | ∞ | 0.50 | | |
| 25 | 515.993 | 4.77 | 1.60311 | 60.6 |
| 26 | −57.663 | 0.20 | | |
| 27 | 81.204 | 5.07 | 1.48749 | 70.2 |
| 28 | 2,110.565 | 0.50 | | |
| 29 | 66.646 | 1.30 | 1.84666 | 23.9 |
| 30 | 32.532 | 7.35 | 1.51633 | 64.1 |
| 31 | 181.008 | 3.00 | | |
| 32 | 54.584 | 2.63 | 1.81600 | 46.6 |
| 33 | 90.965 | 0.15 | | |
| 34 | 23.055 | 3.37 | 1.84666 | 23.8 |
| 35 | 23.996 | 5.97 | | |
| 36 | −4,515.682 | 1.30 | 1.77250 | 49.6 |
| 37 | 36.634 | 2.32 | | |
| 38 | 90.298 | 2.74 | 1.51633 | 64.1 |
| 39 | −1,764.864 | 40.00 | | |
| 40 | 36.406 | 6.45 | 1.53775 | 74.7 |
| 41 | −67.284 | 1.43 | | |
| 42 | −572.923 | 1.20 | 1.88300 | 40.8 |
| 43 | 29.052 | 4.54 | 1.54072 | 47.2 |
| 44 | 201.172 | 0.66 | | |
| 45 | 73.685 | 6.58 | 1.51633 | 64.1 |
| 46 | −24.391 | 1.20 | 1.88300 | 40.8 |
| 47 | −208.136 | 0.19 | | |
| 48 | 85.415 | 3.65 | 1.71736 | 29.5 |

-continued

| Unit: mm | | | | |
|---|---|---|---|---|
| 49 | −113.870 | 5.28 | | |
| 50 | ∞ | 33.00 | 1.60859 | 46.4 |
| 51 | ∞ | 13.20 | 1.51680 | 64.2 |
| 52 | ∞ | 8.90 | | |
| Image plane | ∞ | | | |

| Various data | | |
|---|---|---|
| Zoom ratio 37.60 | | |
| Focal length | 10.08 | 379.02 |
| F-number | 2.05 | 3.69 |
| Half angle of view | 28.62 | 0.83 |
| Image height | 5.50 | 5.50 |
| Total lens length | 394.30 | 394.30 |
| BF | 8.90 | 8.90 |
| d10 | 0.99 | 123.57 |
| d16 | 7.34 | 3.07 |
| d20 | 130.33 | 15.40 |
| d23 | 5.18 | 1.80 |
| d52 | 8.90 | 8.90 |

| Zooming lens unit data | | |
|---|---|---|
| Unit | First surface | Focal length |
| 1 | 1 | 161.80 |
| 2 | 11 | −20.94 |
| 3 | 17 | 579.02 |
| 4 | 21 | −80.29 |
| 5 | 24 | 91.80 |

Numerical Example 4

| Unit: mm | | | | |
|---|---|---|---|---|
| Surface data | | | | |
| Surface number i | ri | di | ndi | vdi |
| 1 | 589.841 | 3.00 | 1.83481 | 42.7 |
| 2 | 149.885 | 1.30 | | |
| 3 | 152.351 | 15.65 | 1.43387 | 95.1 |
| 4 | −492.047 | 11.23 | | |
| 5 | 160.592 | 10.21 | 1.43387 | 95.1 |
| 6 | 1,087.847 | 0.20 | | |
| 7 | 153.990 | 12.42 | 1.43387 | 95.1 |
| 8 | −2,592.277 | 0.23 | | |
| 9 | 108.925 | 5.43 | 1.43387 | 95.1 |
| 10 | 153.921 | (Variable) | | |
| 11 | 90.881 | 1.00 | 2.00100 | 29.1 |
| 12 | 21.685 | 7.05 | | |
| 13 | −43.110 | 0.90 | 1.77250 | 49.6 |
| 14 | 73.380 | 0.08 | | |
| 15 | 40.814 | 3.56 | 1.95906 | 17.5 |
| 16 | 114.711 | (Variable) | | |
| 17 | 138.479 | 4.85 | 1.80810 | 22.8 |
| 18 | −42.915 | 1.10 | | |
| 19 | −31.971 | 1.10 | 1.80100 | 35.0 |
| 20 | −270.762 | (Variable) | | |
| 21 | −52.617 | 1.30 | 1.71999 | 50.2 |
| 22 | 79.855 | 3.85 | 1.84666 | 23.9 |
| 23 | 2,381.914 | (Variable) | | |
| 24* | 201.600 | 4.20 | 1.60311 | 60.6 |
| 25 | −119.087 | 0.20 | | |
| 26 | 76.463 | 8.25 | 1.48749 | 70.2 |
| 27 | −63.856 | 1.30 | 1.84666 | 23.9 |
| 28 | −92.933 | (Variable) | | |
| 29 (Stop) | ∞ | 1.52 | | |
| 30 | 2,806.069 | 4.21 | 1.48749 | 70.2 |
| 31 | −88.886 | 0.50 | | |
| 32 | 274.792 | 5.02 | 1.49700 | 81.5 |
| 33 | −129.722 | 1.30 | 1.84666 | 23.9 |
| 34 | 1,030.411 | 3.50 | | |

-continued

Unit: mm

| | | | | |
|---|---|---|---|---|
| 35 | 66.646 | 1.20 | 1.81600 | 46.6 |
| 36 | 51.985 | 0.15 | | |
| 37 | 27.778 | 3.92 | 1.84666 | 23.8 |
| 38 | 31.955 | 5.43 | | |
| 39 | −471.209 | 1.30 | 1.77250 | 49.6 |
| 40 | 46.909 | 2.62 | | |
| 41 | 234.294 | 3.17 | 1.51633 | 64.1 |
| 42 | −105.807 | 40.00 | | |
| 43 | 32.558 | 6.12 | 1.53775 | 74.7 |
| 44 | 3,109.360 | 0.80 | | |
| 45 | 59.152 | 1.20 | 1.88300 | 40.8 |
| 46 | 24.463 | 4.70 | 1.54072 | 47.2 |
| 47 | 83.194 | 0.71 | | |
| 48 | 46.231 | 5.42 | 1.51633 | 64.1 |
| 49 | −35.713 | 1.20 | 1.88300 | 40.8 |
| 50 | 149.056 | 1.50 | | |
| 51 | 90.975 | 3.94 | 1.71736 | 29.5 |
| 52 | −463.366 | 5.28 | | |
| 53 | ∞ | 33.00 | 1.60859 | 46.4 |
| 54 | ∞ | 13.20 | 1.51680 | 64.2 |
| 55 | ∞ | 8.90 | | |
| Image plane | ∞ | | | |

Aspherical surface data

Twenty-fourth surface

K = −1.04816e+001 A4 = −1.41939e−006 A6 = 1.08503e−010 A8 = −4.54085e−014

Various data
Zoom ratio 39.40

| | | |
|---|---|---|
| Focal length | 10.08 | 397.13 |
| F-number | 2.05 | 3.74 |
| Half angle of view | 28.62 | 0.79 |
| Image height | 5.50 | 5.50 |
| Total lens length | 406.05 | 406.05 |
| BF | 8.90 | 8.90 |
| d10 | 1.04 | 124.31 |
| d16 | 5.78 | 3.06 |
| d20 | 130.87 | 17.52 |
| d23 | 4.70 | 1.80 |
| d28 | 5.43 | 1.14 |
| d55 | 8.90 | 8.90 |

Zooming lens unit data

| Unit | First surface | Focal length |
|---|---|---|
| 1 | 1 | 161.80 |
| 2 | 11 | −19.22 |
| 3 | 17 | 300.76 |
| 4 | 21 | −80.29 |
| 5 | 24 | 57.19 |
| 6 | 29 | 76.70 |

Numerical Example 5

Unit: mm

Surface data

| Surface number i | ri | di | ndi | vdi |
|---|---|---|---|---|
| 1 | 604.994 | 3.00 | 1.83481 | 42.7 |
| 2 | 149.605 | 1.37 | | |
| 3 | 152.779 | 15.06 | 1.43387 | 95.1 |
| 4 | −490.782 | 11.11 | | |
| 5 | 162.818 | 9.52 | 1.43387 | 95.1 |
| 6 | 844.108 | 0.20 | | |
| 7 | 152.252 | 12.80 | 1.43387 | 95.1 |
| 8 | −1,696.813 | 0.19 | | |
| 9 | 110.181 | 5.34 | 1.43387 | 95.1 |
| 10 | 157.321 | (Variable) | | |
| 11 | 89.153 | 1.00 | 2.00100 | 29.1 |
| 12 | 22.152 | 6.81 | | |
| 13 | −41.443 | 0.90 | 1.77250 | 49.6 |
| 14 | 84.280 | −0.11 | | |
| 15 | 42.826 | 3.35 | 1.95906 | 17.5 |
| 16 | 108.937 | (Variable) | | |
| 17 | 125.162 | 4.96 | 1.80810 | 22.8 |
| 18 | −41.164 | 1.06 | | |
| 19 | −31.217 | 1.10 | 1.80100 | 35.0 |
| 20 | −218.186 | (Variable) | | |
| 21 | −52.822 | 1.30 | 1.71999 | 50.2 |
| 22 | 75.913 | 3.92 | 1.84666 | 23.9 |
| 23 | 1,339.758 | (Variable) | | |
| 24 (Stop) | ∞ | 0.50 | | |

-continued

Unit: mm

| | | | | |
|---|---|---|---|---|
| 25 | 1,967.343 | 4.42 | 1.60311 | 60.6 |
| 26 | −59.451 | 0.20 | | |
| 27 | 89.398 | 5.23 | 1.48749 | 70.2 |
| 28 | −609.377 | 0.50 | | |
| 29 | 77.882 | 1.30 | 1.84666 | 23.9 |
| 30 | 36.248 | 7.30 | 1.51633 | 64.1 |
| 31 | 359.922 | (Variable) | | |
| 32 | 49.875 | 2.78 | 1.81600 | 46.6 |
| 33 | 82.312 | 0.15 | | |
| 34 | 23.259 | 3.22 | 1.84666 | 23.8 |
| 35 | 23.782 | 6.09 | | |
| 36 | 830.103 | 1.30 | 1.77250 | 49.6 |
| 37 | 36.717 | (Variable) | | |
| 38 | 111.095 | 2.70 | 1.51633 | 64.1 |
| 39 | −494.539 | 40.00 | | |
| 40 | 34.087 | 6.30 | 1.53775 | 74.7 |
| 41 | −88.999 | 1.43 | | |
| 42 | 388.451 | 1.20 | 1.88300 | 40.8 |
| 43 | 26.069 | 4.54 | 1.54072 | 47.2 |
| 44 | 107.307 | 0.66 | | |
| 45 | 72.849 | 6.39 | 1.51633 | 64.1 |
| 46 | −25.295 | 1.20 | 1.88300 | 40.8 |
| 47 | −168.787 | 0.17 | | |
| 48 | 88.240 | 3.45 | 1.71736 | 29.5 |
| 49 | −139.790 | 5.28 | | |
| 50 | ∞ | 33.00 | 1.60859 | 46.4 |
| 51 | ∞ | 13.20 | 1.51680 | 64.2 |
| 52 | ∞ | (Variable) | | |
| Image plane | ∞ | | | |

Various data
Zoom ratio 37.92

| | | |
|---|---|---|
| Focal length | 10.08 | 382.21 |
| F-number | 2.05 | 3.53 |
| Half angle of view | 21.65 | 0.60 |
| Image height | 4.00 | 4.00 |
| Total lens length | 390.67 | 392.68 |
| BF | 8.90 | 8.90 |
| d10 | 0.99 | 125.51 |
| d16 | 3.55 | 4.68 |
| d20 | 131.62 | 11.81 |
| d23 | 5.61 | 1.79 |
| d31 | 1.99 | 1.99 |
| d37 | 2.60 | 2.60 |
| d52 | 8.90 | 8.90 |

Zooming lens unit data

| Unit | First surface | Focal length |
|---|---|---|
| 1 | 1 | 163.48 |
| 2 | 11 | −19.26 |
| 3 | 17 | 205.33 |
| 4 | 21 | −79.34 |
| 5 | 24 | 84.44 |

TABLE 1

Corresponding values of conditional expressions in Numerical Examples 1 to 5

| Conditional Expression Number | Conditional Expression | Numerical Example 1 | Numerical Example 2 | Numerical Example 3 | Numerical Example 4 | Numerical Example 5 |
|---|---|---|---|---|---|---|
| (1) | $\beta_{r2}$ | −6.039 | −16.000 | −0.500 | −1.147 | −0.500 |
| (2) | $f_{r1}/f_{r2}$ | −0.189 | −0.604 | −0.419 | −3.642 | −0.382 |
| (3) | $f_{r3}/f_{r2}$ | −3.284 | −15.774 | −1.222 | −2.060 | −1.155 |
| (4) | $|\alpha' - \alpha|$ | 0.023 | 0.100 | 0.048 | 0.091 | 0.043 |

Figure 21:
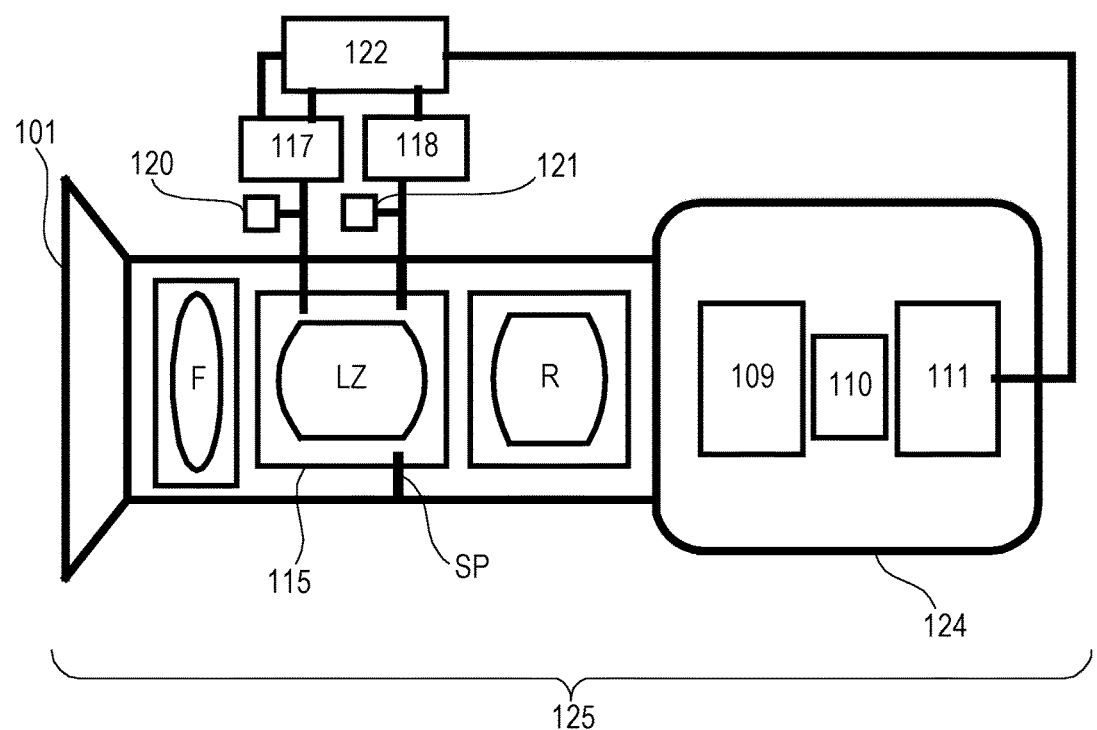
FIG. 21 is a diagram for illustrating an image pickup apparatus according to an embodiment of the present invention.

FIG. 21 is a schematic diagram of an image pickup apparatus (television camera system) using the zoom lens according to each of Examples as a photographing optical system. In FIG. 21, the zoom lens according to any one of Examples 1 to 5 is denoted by 101, and a camera is denoted by 124. The zoom lens 101 is detachably mountable to the camera 124. The zoom lens 101 is mounted to the camera 124 to form an image pickup apparatus 125. The zoom lens 101 includes a first lens unit F, a magnifying unit LZ, and an image forming lens unit R. The first lens unit F includes a focusing lens unit. The magnifying unit LZ includes a variator lens unit, which is configured to move on the optical axis for zooming, and a compensator lens unit, which is configured to move on the optical axis to correct an image plane variation accompanying zooming. An aperture stop is denoted by SP. A drive mechanism, for example, a helicoid or a cam, is configured to drive a focus adjustment unit included in the first lens unit F in an optical axis direction. A drive mechanism 115, for example, a helicoid or a cam, is configured to drive the magnifying unit LZ in the optical axis direction. Motors (drive units) 117, and 118 are configured to electrically drive the drive mechanism 115 and the aperture stop SP, respectively. Detectors 120, and 121, for example, encoders, potentiometers, or photosensors, are configured to detect positions on the optical axis of the focus adjustment unit and the magnifying unit LZ, and an aperture diameter of the aperture stop SP, respectively. The camera 124 includes a glass block 109, which corresponds to an optical filter or a color separation optical system in the camera 124, and a solid image pickup element (photoelectric converter) 110, for example, a CCD sensor or a CMOS sensor, which is configured to receive an optical image formed by the zoom lens 101. Moreover, CPUs 111 and 122 are configured to control various kinds of driving of the camera 124 and the zoom lens 101.

The zoom lens according to the present invention may be applied to a digital video camera, a television camera, a cinema camera, a photography camera, or another camera to provide the zoom lens and the image pickup apparatus having the high optical performance over the entire zooming range even during image stabilization, which are small and lightweight as the entire mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-037103, filed Feb. 28, 2017, which is hereby incorporated by reference herein in its entirety.

What is claimed is:

1. A zoom lens comprising in order from an object side to an image side:
   a plurality of lens units respectively configured to move for zooming;
   an aperture stop; and
   a lens unit B having a positive refractive power and configured not to move for zooming,
   wherein the lens unit B includes a front lens sub unit and a rear lens sub unit with an air interval therebetween longest between the aperture stop and an image plane of the zoom lens,
   wherein the front lens sub unit consists of in order from the object side to the image side:
      a first part having a positive refractive power;
      a second part having a negative refractive power and configured to move in a direction having a component perpendicular to an optical axis of the zoom lens to perform image stabilization; and a third part having a positive refractive power,
wherein conditional expressions $$-20.00 < \beta_{r2} < -0.20;$$

$$-9.00 < f_{r1}/f_{r2} < -0.05; \text{ and}$$

$$-20.00 < f_{r3}/f_{r2} < -1.00$$

are satisfied where $\beta_{r2}$ represents a lateral magnification of the second part, $f_{r1}$ represents a focal length of the first part, $f_{r2}$ represents a focal length of the second part, and $f_{r3}$ represents a focal length of the third part.

2. The zoom lens according to claim 1, wherein a conditional expression $$0.01 < |\alpha' - \alpha| < 0.15$$

is satisfied where $\alpha$ represents an inclination of a paraxial axial ray that enters the second part from the object side thereof, and $\alpha'$ represents an inclination of the paraxial axial ray that exits the second part to the image side thereof, an inclination of a ray being obtained by dividing a difference in height of the ray at a section along the optical axis by a length of the section.

3. The zoom lens according to claim 1, wherein the zoom lens is configured such that a conditional expression $$0 \le |\alpha_{ie}| < +0.03$$

is satisfied where $\alpha_{ie}$ represents an inclination of a paraxial axial ray in the air interval obtained in a case where light having a height 1, which is normalized by a focal length of the zoom lens, from the optical axis enters the zoom lens in parallel to the optical axis, an inclination of a ray being obtained by dividing a difference in height of the ray at a section along the optical axis by a length of the section.

4. The zoom lens according to claim 1,
wherein the first part includes a positive lens and a cemented lens consisting of a positive lens and a negative lens,
wherein the second part consists of, in order from the object side to the image side, a negative lens, a positive lens, and a negative lens, and
wherein the third part consists of a positive lens.

5. The zoom lens according to claim 1, wherein the plurality of lens units consist of, in order from the object side to the image side, a first lens unit having a positive refractive power and configured not to move for zooming, and three or four lens units each configured to move for zooming.

6. The zoom lens according to claim 1, wherein the plurality of lens units consist of, in order from the object side to the image side, a first lens unit having a positive refractive power and configured not to move for zooming, a second lens unit having a negative refractive power and configured to move for zooming, a third lens unit configured to move for zooming, and a fourth lens unit having a negative refractive power and configured to move for zooming.

7. The zoom lens according to claim 1, wherein the plurality of lens units consist of, in order from the object side to the image side, a first lens unit having a positive refractive power and configured not to move for zooming, a second lens unit having a negative refractive power and configured to move for zooming, a third lens unit configured to move for zooming, a fourth lens unit having a negative refractive power and configured to move for zooming, and a fifth lens unit having a positive refractive power and configured to move for zooming.

8. The zoom lens according to claim 5,
wherein the first lens unit consists of, in order from the object side to the image side, a first lens sub unit configured not to move for focusing, a second lens sub unit having a positive refractive power and configured to move for focusing, and a third lens sub unit having a positive refractive power and configured to move for focusing, and
wherein the second lens sub unit and the third lens sub unit are respectively configured to move along respective mutually different loci for focusing.

9. The zoom lens according to claim 1, wherein the plurality of lens units consist of, in order from the object side to the image side, a first lens unit having a positive refractive power and configured to move for zooming, a second lens unit having a negative refractive power and configured to move for zooming, a third lens unit configured to move for zooming, and a fourth lens unit having a negative refractive power and configured to move for zooming.

10. The zoom lens according to claim 1,
wherein the plurality of lens units consist of, in order from the object side to the image side, a first lens unit having a positive refractive power and configured not to move for zooming, a second lens unit having a negative refractive power and configured to move for zooming, and at least one lens unit each configured to move for zooming,
wherein the first lens unit consists of, in order from the object side to the image side, a first lens sub unit configured not to move for focusing, a second lens sub unit having a positive refractive power and configured to move toward the object side from focusing on an object at infinity to focusing on an object at a minimum object distance, and a third lens sub unit having a positive refractive power and configured to move toward the object side from focusing on an object at infinity to focusing on an object at the minimum object distance, and
wherein the second lens sub unit and the third lens sub unit are respectively configured to move along respective mutually different loci for focusing.

11. The zoom lens according to claim 1,
wherein the plurality of lens units consist of, in order from the object side to the image side, a first lens unit having a positive refractive power and configured to move for zooming, a second lens unit having a negative refractive power and configured to move for zooming, and at least one lens unit each configured to move for zooming,
wherein the first lens unit consists of, in order from the object side to the image side, a first lens sub unit and configured not to move for focusing, a second lens sub unit having a positive refractive power and configured to move toward the object side from focusing on an object at infinity to focusing on an object at a minimum object distance, and a third lens sub unit having a positive refractive power and configured to move toward the object side from focusing on an object at infinity to focusing on an object at the minimum object distance, and
wherein the second lens sub unit and the third lens sub unit are respectively configured to move along respective mutually different loci for focusing.

12. The zoom lens according to claim 1, further comprising an extender lens unit configured to be selectively inserted on an optical path between the front lens sub unit and the rear lens sub unit to extend a focal length of the zoom lens.

13. An image pickup apparatus comprising:
a zoom lens; and
an image pickup element configured to receive an image formed by the zoom lens,
wherein the zoom lens comprises in order from an object side to an image side:
a plurality of lens units respectively configured to move for zooming;
an aperture stop; and
a lens unit B having a positive refractive power and configured not to move for zooming,
wherein the lens unit B includes a front lens sub unit and a rear lens sub unit with an air interval therebetween longest between the aperture stop and an image plane of the zoom lens,
wherein the front lens sub unit consists of in order from the object side to the image side:
a first part having a positive refractive power;
a second part having a negative refractive power and configured to move in a direction having a component perpendicular to an optical axis of the zoom lens to perform image stabilization; and
a third part having a positive refractive power,
wherein conditional expressions $$-20.00<\beta_{r2}<-0.20;$$

$$-9.00<f_{r1}/f_{r2}<-0.05; \text{ and}$$

$$-20.00<f_{r3}/f_{r2}<-1.00$$

are satisfied where $\beta_{r2}$ represents a lateral magnification of the second part, $f_{r1}$ represents a focal length of the first part, $f_{r2}$ represents a focal length of the second part, and $f_{r3}$ represents a focal length of the third part.

14. A zoom lens comprising in order from an object side to an image side:
a plurality of lens units respectively configured to move for zooming;
an aperture stop; and
a lens unit B having a positive refractive power and configured not to move for zooming,
wherein the lens unit B includes a front lens sub unit and a rear lens sub unit with an air interval therebetween longest between the aperture stop and an image plane of the zoom lens,
wherein the front lens sub unit consists of in order from the object side to the image side:
a first part having a positive refractive power;
a second part having a negative refractive power and configured to move in a direction having a component perpendicular to an optical axis of the zoom lens to perform image stabilization; and
a third part having a postive refractive power,
wherein a conditional expression $$-20.00<\beta_{r2}<-0.20$$

is satisfied where $\beta_{r2}$ represents a lateral magnification of the second part.

15. The zoom lens according to claim 14, wherein a conditional expression $$-9.00<f_{r1}/f_{r2}<-0.05$$

is satisfied where $f_{r1}$ represents a focal length of the first part, and $f_{r2}$ represents a focal length of the second part.

16. The zoom lens according to claim 14, wherein a conditional expression $$-20.00<f_{r3}/f_{r2}<-1.00$$

is satisfied where $f_{r2}$ represents a focal length of the second part, and $f_{r3}$ represents a focal length of the third part.

17. An image pickup apparatus comprising:
a zoom lens defined in claim 14; and
an image pickup element configured to receive an image formed by the zoom lens.

* * * * *